United States Patent
Takeshita et al.

[11] Patent Number: 6,135,595
[45] Date of Patent: Oct. 24, 2000

[54] EYEGLASS LENSES FOR CORRECTING COLOR VISION

[75] Inventors: Katsuyoshi Takeshita; Kunihiko Yano; Yoshihiko Kasai; Toshiya Otsuki, all of Nagano, Japan

[73] Assignees: Seiko Epson Corporation, Tokyo; World Munsell Co., Ltd., Tsu, both of Japan

[21] Appl. No.: 09/253,698

[22] Filed: Feb. 22, 1999

[30] Foreign Application Priority Data

Feb. 26, 1998 [JP] Japan .................................. 10-046039
Aug. 27, 1998 [JP] Japan .................................. 10-242359

[51] Int. Cl.[7] .................................................. G02C 7/10
[52] U.S. Cl. .......................... 351/163; 351/166; 351/177
[58] Field of Search .................................. 351/163, 164, 351/165, 177, 162, 166

[56] References Cited

U.S. PATENT DOCUMENTS

| | | | |
|---|---|---|---|
| 4,070,097 | 1/1978 | Gelber | 351/44 |
| 5,015,523 | 5/1991 | Kawashima et al. | 427/162 |
| 5,369,453 | 11/1994 | Chen et al. | 351/163 |
| 5,574,517 | 11/1996 | Pang et al. | 351/44 |
| 5,774,202 | 6/1998 | Abraham et al. | 351/177 |

FOREIGN PATENT DOCUMENTS 615 144   9/1994   European Pat. Off. .

Primary Examiner—Scott J. Sugarman
Attorney, Agent, or Firm—Sughrue, Mion, Zinn, Macpeak & Seas, PLLC

[57] ABSTRACT

An inexpensive, high-performance, color vision correcting plastic eyeglass lens comprises a partial reflection film for partially reflecting light, or a coloring agent for partially absorbing light, or a combination thereof, so that an intended color vision rectifying spectral characteristic curve can be established in or imparted to the lens.

14 Claims, 15 Drawing Sheets

EYEGLASS LENSES FOR CORRECTING COLOR VISION

BACKGROUND OF THE INVENTION

This invention relates to eyeglass lenses for correcting color vision, which are capable of imparting the ability of discriminating normal color vision to color vision defectives having color blindness or color weakness.

Abnormal color vision includes congenital color vision defect and acquired color vision defect. The acquired abnormal color vision is caused as a result of diseases in the eyes or brain accompanied with other troubles, such as visual loss, strongly appearing in most cases. The congenital abnormal color vision depends solely on inheritance, and is usually called color blindness or color weakness. Any effective curing measure for the congenital color vision abnormality has never been found yet.

Optic cells in the eyes of human beings are classified into two types including optic rod cells and optic cone cells. The optic rod cells exhibit only sensitivity to brightness and darkness, and the optic cone cells serve to sensitize three light rays necessary for creating all color sensitization. The optic cone cells include three types, which are respectively called a red optic cone cell, a green optic cone cell and a blue optic cone cell when mentioned from a longer wavelength side. The three types of optic cells undergo the respective stimuli, and one is able to perceive a given color based on the combination in intensity of the stimuli.

A so-called "color vision defect" takes place due to either the incomplete abnormality or the absence of any of these three types of optic cells. The case where a trouble is involved in the red optic cone cells is called first abnormal color vision. Likewise, the case where a trouble results from the green optic cone cells is called second abnormal color vision, and the case where a trouble is involved in the blue optic cone cells is called third abnormal color vision. The third abnormal color vision is very rare in its frequency of appearance, thus presenting little problem thereon from the clinical standpoint.

The methods of rectifying abnormal color vision are disclosed, for example, in Japanese Laid-open Patent Application Nos. Sho.47-25990 and Sho.59-148027 and U.S. Pat. Nos. 4,300,819, 3,877,797 and 5,369,453. In Japanese Laid-open Patent Application No. Sho.47-25990, spectral characteristics effective for the rectification are not shown, so that if an absorption band in a dark vision is not imparted to, a complementary color with a long wavelength is particularly unlikely to be delivered to the optic nerve, thus making color recognition difficult. In Japanese Laid-open Patent Application No. Sho.59-148027 and U.S. Pat. No. 4,300,819, lenses, part of which is color(ed, are used so as to ensure the rectification by utilizing both the movements of eyes watching an object and an after-image. Moreover, in U.S. Pat. No. 3,877,797, the rectification is performed such that spectra emitted from a light-emitting object or reflecting object are altered through an optical filter prior to their arrival at eyes.

In U.S. Pat. No. 5,369,453, it is stated that as a result of computer resting of 300 patients of abnormal color vision, most of the color-blind viewers are able to discriminate three primary colors of red, green and blue in the trichromatic color vision system. They are merely appreciably poor in the ability of discriminating a color within a certain range of wavelength. The proportion of stimulation value of three kinds of optic cone cells is changed externally so that the proportion of the three kinds of optic cone cells being stimulated is caused to come closer to that of normal viewers, thereby ensuring the rectification of color blindness. Based on this, there can be obtained 4 types and 32 grades of color vision rectifying spectral characteristic curves and parameters. It has been found that color blindness can be classified into any of the 4 types and the 32 grades of color vision rectifying spectra. When a color-blind viewer wears eyeglasses, of which lenses exhibit color vision rectifying spectral characteristic curves corresponding to his/her color blindness, the color blindness can be properly rectified.

However, although the color vision rectifying theory is submitted in the U.S. Pat. No. 5,369,453, the lenses of color vision correcting eyeglasses are made only on an experimental basis, and there has never been proposed inexpensive and high-performance eyeglass lenses for color rectification which are serviceable on the market.

Among the four types of color vision rectifying spectral characteristic curves, there is a type wherein spectral changes are vigorous and light absorption has to be partly made at 100%. When using vacuum deposition (for partial reflection film) set out in the U.S. Pat. No. 5,369,453, it is difficult to make inexpensive, accurate lenses having prescribed color vision rectifying spectral characteristic curves. Especially, with plastic lenses whose demand has recently been great, limitation is placed on the type of constituent material for the vacuum deposition film. Thus, it is not easy to accurately convert all of the four types of color vision rectifying spectral characteristic curves into plastic eyeglass lenses.

SUMMARY OF THE INVENTION

Under these circumstances in the art, the present invention has its object for the provision of high-performance lenses for color vision rectifying eyeglass lenses, which are inexpensive and exhibit prescribed color vision rectifying spectral characteristic curves.

We have made intensive studies on eyeglass lenses, and particularly, plastic lenses whose material for vacuum deposition film is limited in type in order to impart such color vision rectifying spectral characteristic curves as set out above to the respective lenses. As a result, it has been found that when making use of either partial absorption of light based on a coloring agent or partial reflection of light based on a partial reflection film, or both thereof, by properly using such coloring agent and partial reflection film as mentioned above, all kinds of color vision rectifying spectral characteristic curves can be accurately realized as plastic lenses, thereby providing inexpensive and high-performance color vision rectifying eyeglass lenses.

It has also been found that the partial absorption of light, for which a coloring agent is used, can be inexpensively created. More particularly, intended color vision rectifying spectral characteristic curves can be inexpensively imparted to individual eyeglass lenses on proper selection of a dye for dyeing a lens, a pigment to be formulated in a lens substrate, or a combination thereof.

With plastic lenses, the type of material for a vacuum deposition film is limited because of the low heat resistance of the lens substrate. Since the substrate and the vacuum deposition film differ from each other with respect to the coefficient of thermal expansion, it is not possible to form a thick vacuum deposition film. From this, it has been found that plastic lenses for commercial service, layers built up as a vacuum deposition film are as small in number as about 16 in maximum.

Within such a limited range of the number of layers as mentioned above, when an eyeglass lens is formed with a partial reflection film at a convex side (an outer surface side) thereof and also with an anti-reflecting film, which is formed as a vacuum deposition film, at a concave side (inner surface side), a prescribed color vision rectifying spectral characteristic curve is ensured by means of the partial reflection film along with the reduction of reflection, thereby providing a clear, color vision correcting eyeglass lens.

Using the partial reflection film having such a layer structure made of about 16 layers as mentioned above, there may be some case where color vision rectifying spectral characteristic curves with considerable irregular spectral changes as set out hereinbefore cannot be realized. To avoid this, a coloring agent has to be used in combination. A lens may, in some case, be colored in deep red, thus presenting a problem of the lens being poor in appearance. In order to solve the problem, a partial reflection film is provided not only on the convex side of the lens, but also on the concave side. In this way, it has been found that the formation of a good-looking partial reflection film alone permits a curve characteristic of color vision rectifying spectra with considerable irregular spectral changes to be imparted to a plastic lens.

Moreover, it has been further found that if a hard coat film is formed on a plastic lens so as to impart a scuffing resistance thereto, the film permits easy coloration with a dye and is functioned as an underlying layer for a partial reflection film or anti-reflecting film, thereby providing high-performance eyeglass lenses.

Accordingly, the present invention provides an eyeglass lens for correcting abnormal color vision, which has a color vision rectifying spectral characteristic curve capable of externally converting the proportion of stimulation value of three kinds of optic cone cells in the retina of a color vision defective wherein the color vision rectifying characteristic curve is established by either incorporating a coloring agent in the lens or forming a partial reflection film on the lens, or by combination thereof. By this, the lens has a transmission curve corresponding to or coincident with an intended color vision rectifying characteristic curve.

It is preferred that the eyeglass lens for correcting abnormal color vision is made of a plastic resin.

It is also preferred that the coloring agent consists of a dye and/or a pigment.

It is further preferred that the partial reflection film has a layer structure made of not larger than 16 layers.

It is preferred that the eyeglass lens for correcting abnormal color vision is formed with the partial reflection film at a convex side thereof and also with a anti-reflecting film at a concave side thereof.

It is preferred that the partial reflection film is formed on opposite sides of the eyeglass lens.

It is preferred that the eyeglass lens has a silicone hard coat film thereon.

DESCRIPTION OF THE PREFERRED EMBODIMETNS

Figure 1:
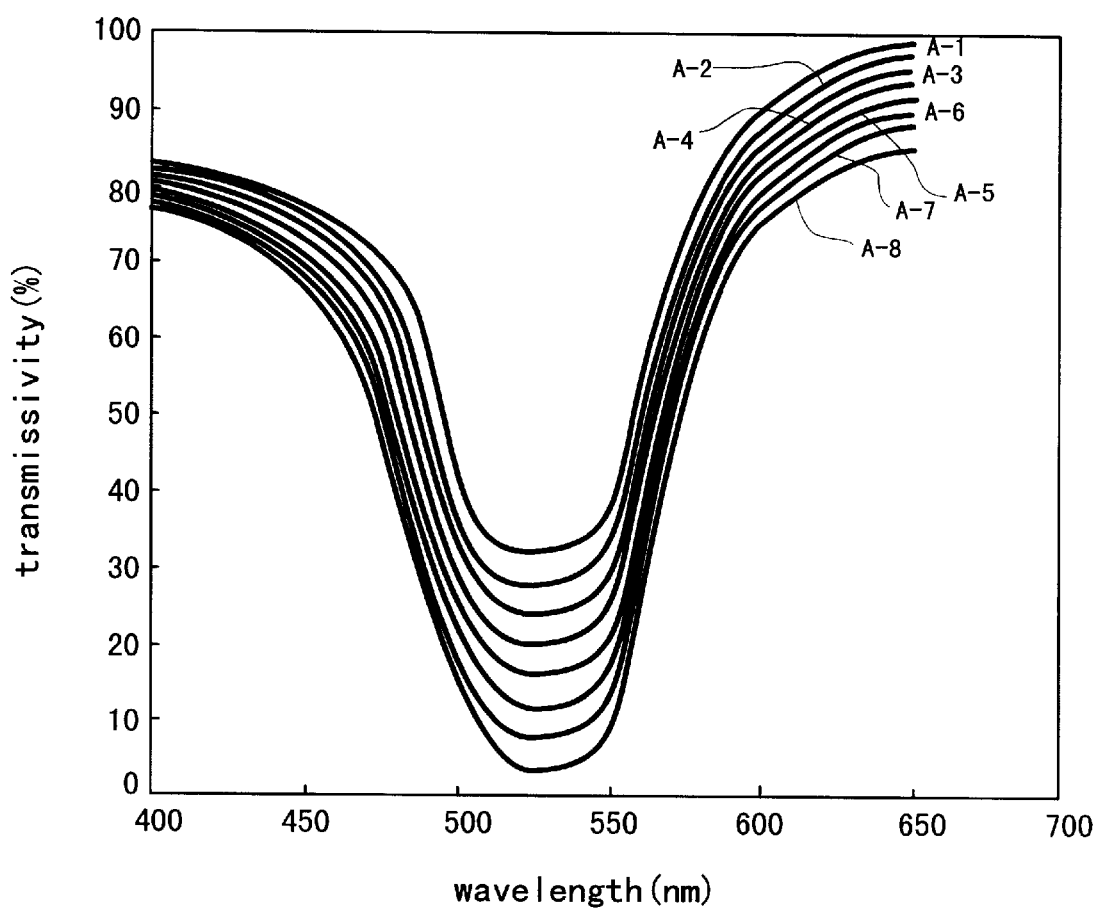
FIG. 1 is a graph showing a color vision rectifying spectral characteristic curve of A type.
Figure 2:
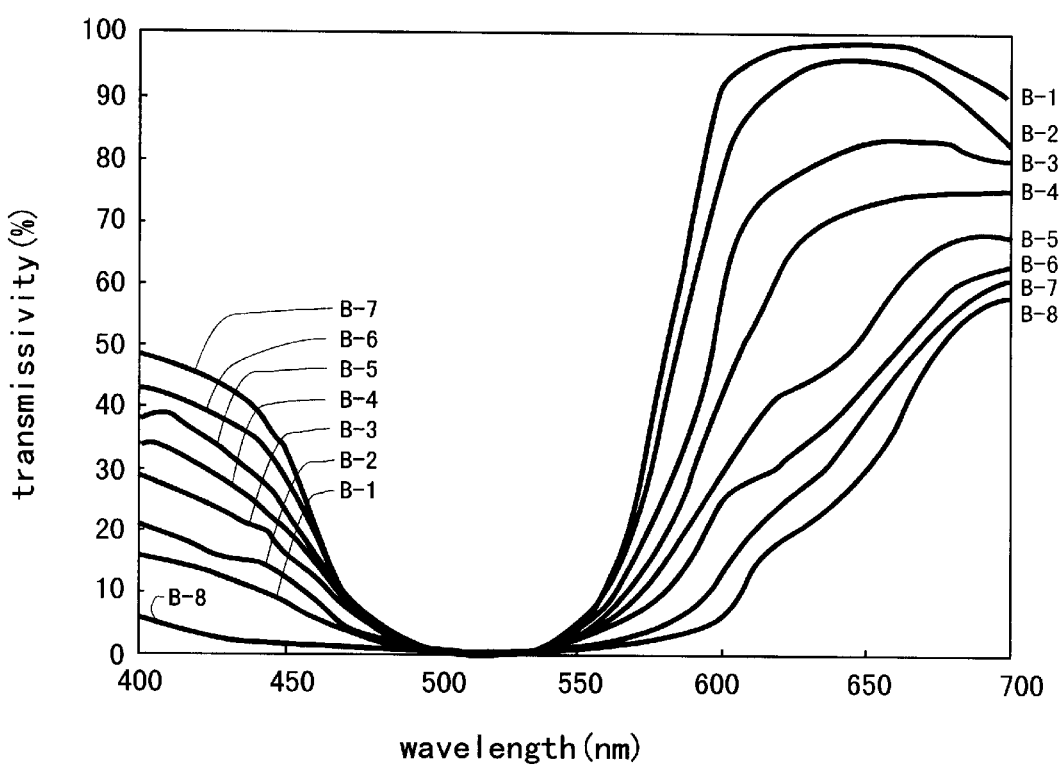
FIG. 2 is a graph showing a color vision rectifying spectral characteristic curve of B type.
Figure 3:
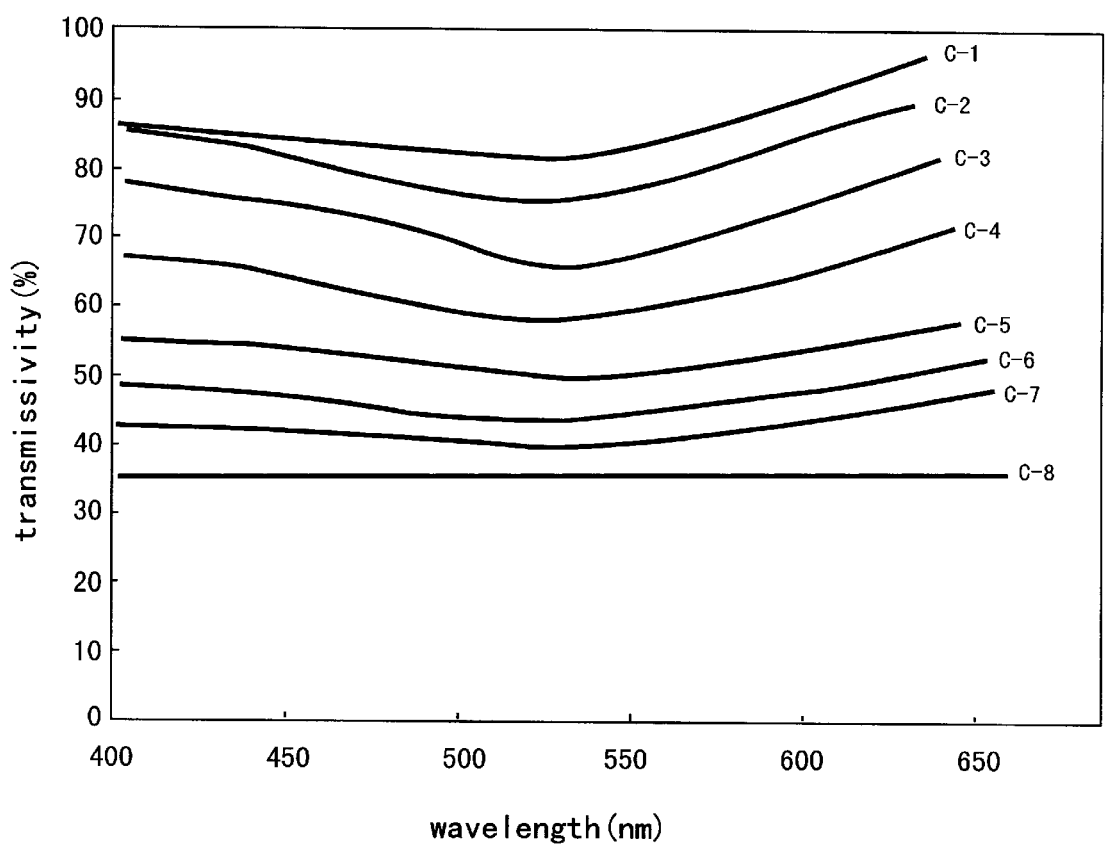
FIG. 3 is a graph showing a color vision rectifying spectral characteristic curve of C type.
Figure 4:
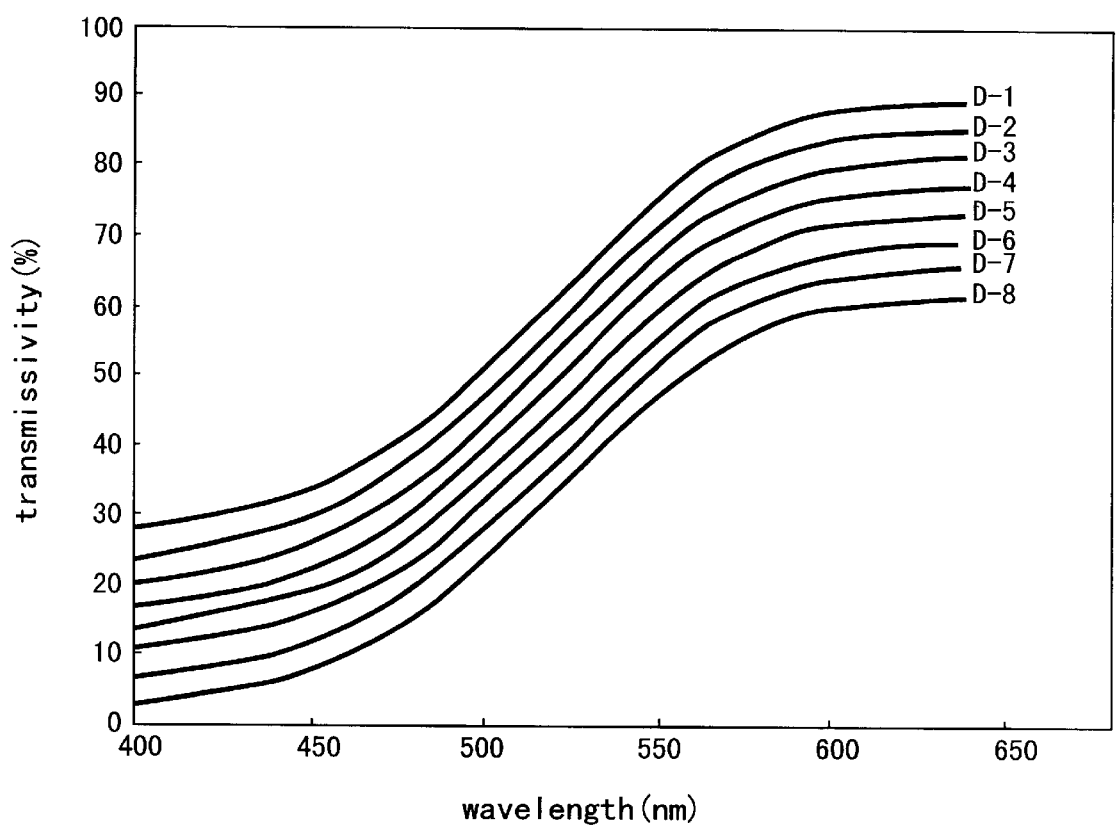
FIG. 4 is a graph showing a color vision rectifying spectral characteristic curve of D type.

Preferred embodiments of a color vision correcting eyeglass lens according to the invention are described, which should not be construed is limiting the invention thereto.

The color vision correcting eyeglass lens of the invention is a lens that has a color vision rectifying spectral characteristic curve capable of converting the proportion of stimulation value of three kinds of optic cone cells in the retina of a color vision defective as defined before.

Currently recognized color vision rectifying spectral characteristic curves slightly differ from those of 4 types and 32 grades set forth in U.S. Pat. No. 5,369,453. Especially, curves of B type are considerably changed. The absorbances of the respective types at specific wavelengths are shown in Table 1 below. The spectral characteristic curves of these types are shown in FIGS. 1 to 4, respectively.

TABLE 1

| A Type | | | |
|---|---|---|---|
| | 460 nm | 525 nm | 600 nm |
| A-1 | 75 | 32 | 90 |
| A-2 | 73 | 28 | 88 |
| A-3 | 71 | 24 | 86 |
| A-4 | 69 | 20 | 84 |
| A-5 | 67 | 16 | 82 |
| A-6 | 65 | 12 | 80 |
| A-7 | 63 | 8 | 78 |
| A-8 | 61 | 4 | 76 |

| B Type | | | |
|---|---|---|---|
| | 440 nm | 530 nm | 600 nm |
| B-1 | 10 | 0 | 90 |
| B-2 | 15 | 0 | 75 |
| B-3 | 20 | 0 | 61 |
| B-4 | 25 | 0 | 47 |
| B-5 | 30 | 0 | 23 |
| B-6 | 35 | 0 | 13 |
| B-7 | 40 | 0 | 7 |
| B-8 | 0 | 0 | 3 |

| C Type | | | |
|---|---|---|---|
| | 440 nm | 530 nm | 600 nm |
| C-1 | 85 | 82 | 90 |
| C-2 | 84 | 76 | 85 |
| C-3 | 76 | 66 | 75 |
| C-4 | 66 | 58 | 65 |
| C-5 | 55 | 50 | 54 |
| C-6 | 48 | 44 | 48 |
| C-7 | 43 | 40 | 44 |
| C-8 | 36 | 36 | 36 |

| D Type | | | |
|---|---|---|---|
| | 440 nm | 530 nm | 600 nm |
| D-1 | 32 | 66 | 88 |
| D-2 | 28 | 62 | 84 |
| D-3 | 24 | 58 | 80 |
| D-4 | 20 | 54 | 76 |
| D-5 | 18 | 50 | 72 |
| D-6 | 14 | 46 | 68 |
| D-7 | 10 | 42 | 64 |
| D-8 | 6 | 38 | 60 |

Abnormal color vision, such as color blindness or color weakness, can be classified into 4 types and 32 grades. When a color vision defective wears eyeglass lenses having spectral characteristic curves adapted for the person, the proportion of stimulation value of three kinds of optic cone cells is improved to the one closer to that of normal viewers, thereby rectifying the abnormal color vision.

Among the characteristic curves shown, the B type curves involve spectra which undergo considerable irregular changes, and are of the type which is most difficult in controlling the spectra.

The color vision rectifying eyeglass lens of the invention is characterized in that a prescribed color vision spectral characteristic curve is established in a glass or plastic lens by incorporating a coloring agent in the lens or by forming a partial reflection film thereon, or through a combination thereof.

In the practice of the invention, plastic lenses are preferably used. The types of plastic lenses are not critical, and include, for example, a resin obtained by radical polymerization of diethylene glycol bis(allyl carbonate), polyurethane resins obtained by reaction between isocyanate compounds and hydroxy compounds such as diethylene glycol, thiourethane resins obtained by reaction between isocyanate compounds and polythiol compounds, and the like.

The eyeglass lenses of the invention have the purpose of rectifying color vision, and may not need any refractive power, unlike ordinary lenses used for correction of eyesight. In this sense, the glasses may not be in the form of a lens, but the glass lenses used herein are intended to include glasses having no refractive power. It would be usual that such a color vision rectifying spectral characteristic curve as set out hereinabove is given to a lens for correction of eyesight. The lenses for eyesight correction are fundamentally made of ordinary plastic lenses such as a monofocal lens for short or long sight, a multifocal lens and the like.

In general, plastic lenses are formed thereon with a hard coat film in order to impart a scuffing resistance thereto.

Such a hard coat film may be formed on a plastic lens by use of silicone compositions wherein metal oxide fine particles and an organosilicon compound containing a polymerizable group and a hydrolyzable group therein are dispersed, in colloidal state, in a dispersion medium, e.g. water or an organic solvent such as an alcohol.

Examples of the metal oxide fine particles include fine particles of inorganic oxides such as $SiO_2$, $Al_2O_3$, $SnO_2$, $Sb_2O_5$, $Ta_2O_5$, $CeO_2$, $La_2O_3$, $Fe_2O$, $ZnO$, $WO_3O$, $ZrO_2$, $In_2O_3$, and $TiO_2$, or composite fine particles made of two or more inorganic oxides mentioned above.

Specific examples of the organosilicon compounds having a polymerizable group and a hydrolyzable group in one molecule include vinyltrialkoxysilanes, vinyltrichlorosilane, vinyltri(β-methoxy-ethoxy)silane, allyltrialkoxysilanes, acryloxypropyltrialkoxysilanes, methacryloxypropyltrialkoxysilanes, methacryloxypropyldialkoxymethylsilanes, γ-glycideoxypropyltrialcoxysilane, β-(3,4-epoxycyclohexyl)-ethyltrialkoxysilanes, mercaptopropyltrialkoxysilanes, -aminopropyltrialkoxysilanes, N-β(aminoethyl)-γ-aminopropylmethyldialkoxysilanes, and the like.

Dyeable hard coat films capable of being dyed with dyes should preferably comprise, aside from the above two components, polyfunctional epoxy compounds and/or disilane compounds.

Specific examples of the polyfunctional epoxy compounds include aliphatic epoxy compounds such as 1,6-hexanediol diglycidyl ether, ethylene glycol diglycidyl ether, diethylene glycol diglycidyl ether, triethylene glycol diglycidyl ether, tetraethylene glycol diglycidyl ether, nonaethylene glycol diglycidyl ether, propylene glycol diglycidyl ether, dipropylene glycol diglycidyl ether, tripropylene glycol diglycidyl ether, tetrapropylene glycol diglycidyl ether, nonapropylene glycol diglycidyl ether, neopentyl glycol diglycidyl ether, diglycidyl ether of neopentyl glycol hydroxypivalic acid ester, trimethylolpropane diglycidyl ether, trimethylolpropane triglycidyl ether, glycerol diglycidyl ether, glycerol triglycidyl ether, diglycerol diglycidyl ether, diglycerol triglycidyl ether, diglycerol tetraglycidyl ether, pentaerythritoldiglycidyl ether, pentaerythritol triglycidyl ether, pentaerythritol tetraglycidyl ether, dipentaeirythritol tetraglycidyl ether, sorbitol tetraglycidyl ether, diglycidyl ether of tris(2-hydroxyethyl)isocyanurate, triglycidyl ether of tris(2-hydroxyethyl)isocyanurate and the like, alicyclic epoxy compounds such as isophoronediol diglycidyl ether, bis-2,2-hydroxycyclohexylpropane digycidyl ether and the like, and aromatic epoxy compounds such as resorcin diglycidyl ether, bisphenol A diglycidyl ether, bisphenol F diglycidyl ether, bisphenol S diglycidyl ether, o-phthalic acid diglycidyl ester, phenolic novolac polyglycidyl ether, cresol novolac polyglycidyl ether and the like.

Disilane compounds include those of the following general formula (1);

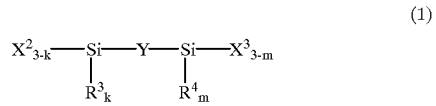

(1)

(wherein $R^3$ and $R^4$ independently represent a hydrocarbon group having 1 to 6 carbon atoms, $X^2$ and $X^3$ independently represent a hydrolyzable group, Y represents an organic group having a carbonate group or an epoxy group, and k and m are each 0 or 1.)

The methods of coating a lens substrate surface with a silicone composition comprising such components as described above include, for example, dipping, spraying, spin coating and the like. After coating, the composition is dried and baked to form a hard coat film.

The coloring agents are used to color plastic lenses therewith, by which a given color vision rectifying spectral characteristic curve is attained by a filtering effect wherein light with a specific wavelength is absorbed to reduce its transmissivity. For instance, several methods of adding a coloring agent are usable including a method wherein prior to the polymerization of a plastic lens, a pigment is formulated into a monomer material, a method of dyeing a plastic lens. The dyeing method of a plastic lens includes a method of directly dyeing a lens substrate, and a method wherein a dyeable hard coat film is first formed on a surface of a lens substrate and then the hard colt film is dyed.

The dyes usable in the present invention include reactive dyes, oil-soluble dyes, disperse dyes, and the like. For coloration of plastic lenses with reactive dyes, mention is made of methods including an internal coloring method wherein a reactive dye, which is able to form a covalent bond such as with a hydroxyl group in a monomer or polymer, is incorporated in a raw material, followed by polymerization, and a method wherein a reactive dye capable of forming a covalent bond with a hydroxyl group in a lens substrate is attached to via immersion. For complete dyeing, it is preferred for these methods to permit immersion of the lenses in an alkaline solution.

Examples of the oil-soluble dye include Solvent Yellow 102, Solvent Yellow 104, Solvent Yellow 117, Solvent Yellow 157, Solvent Orange 68, Solvent Orange 72, Solvent Orange 79, Solvent Green 26, Solvent Violet 33, Solvent Violet 39, Solvent Brown 46, Solvent Black 36, Solvent Black 50, Solvent Blue 97, Solvent Blue 99, Solvent Red 160, Solvent Red 175, Solvent Red 180, Solvent Red 216, and the like.

Examples of the disperse dye include Disperse Yellow 54, Disperse Yellow 122, Disperse Yellow 124, Disperse Yellow 128, Disperse Yellow 134, Disperse Yellow 140, Disperse Orange 5, Disperse Orange 37, Disperse Orange 93, Disperse Orange 103, Disperse Orange 112, Disperse Orange 134, Disperse Orange 370, Disperse Green 7, Disperse Violet 61, Disperse Violet 63, Disperse Brown 1, Disperse Brown 13, Disperse Blue 27, Disperse Blue 54, Disperse Blue 56, Disperse Blue 176, Disperse Blue 182, Disperse Blue 193, Disperse Red 146, Disperse Red 199, Disperse Red 202, Disperse Red 204, Disperse Red 291, and the like.

For the dyeing, with a dye, a lens substrate with or without formation of a hard coat film thereon, it is usual to use a method wherein a disperse dye is dispersed in hot water, or an oil-soluble dye is dissolved in an organic solvent, into which the lens substrate is immersed.

In this case, in order to obtain an intended spectral characteristic curve, the dyes mentioned above may be used singly or in combination of two or more.

When a plastic lens is colored with a dye in such a way as set out above, the intended color vision rectifying spectra can be formed by partial absorption of light with the dye. The coloring agent is inexpensive in cost. It will be noted that an eyeglass lens may assume a deep red color if dyed in conformity with some of the color vision rectifying spectral characteristic curves, thus being unfavorable from the standpoint of appearance thereof.

On the other hand, a partial reflection film is also called as mirror coat, and can be formed by vacuum deposition, ion plating, sputtering or the like. Preferably, the film is formed on the hard coat film set out above. For the vacuum deposition, an ion beam-assisted technique may be used wherein an ion beam is irradiated simultaneously with the vacuum deposition. Either a single-layered structure or a multi-layered structure may be used for film structure.

The inorganic materials usable in the present invention include, for examples, $SiO_2$, SiO, $ZrO_2$, $TiO_2$, TiO, $Ti_2O_3$, $Ti_2O_5$, $Al_2O_3$, $Ta_2O_5$, $CeO_2$, MgO, $Y_2O_3$, $SnO_2$, $MgF_2$, $WO_3$, and the like. These inorganic materials may be used singly or in combination of two or more. Especially, for use of plastic lenses, it is Preferred to use $ZrO_2$, $SiO_2$ and $TiO_2$ because they are able to lower a deposition temperature.

The anti-reflecting film may be likewise formed by vacuum deposition, ion plating, sputtering or the like. For the vacuum deposition, an Lon beam-assisted technique may be used, in which an ion beam is irradiated simultaneously during the course of the vacuum deposition. Either a single-layered anti-reflecting film or a multi-layered anti-reflecting film may be used as a film structure.

Usable inorganic materials include, for example, $SiO_2$, SiO, $ZrO_2$, $TiO_2$, TiO, $Ti_2O_3$, $Ti_2O_5$, $Al_2O_3$, $Ta_2O_5$, $CeO_2$, MgO, $Y_2O_3$, $SnO_2$, $MgF_2$, $WO_3$, and the like. These inorganic materials may be used on their own or in combination of two or more. Especially, for use of plastic lenses, it is preferred to use $ZrO_2$, $SiO_2$ and $TiO_2$ because they are able to lower a deposition temperature.

In case where these partial reflection film and anti-reflecting film are both formed on a single eyeglass lens, it is not possible to form an anti-reflecting film on a partial reflection film. Accordingly, it is preferred to form a partial reflection film on a convex side and an anti-reflecting film on a concave side. By doing so, there can be obtained a clear eyeglass lens, with which unnaturally reflected light becomes lessened in amount in light being passed to the eye.

The partial reflection film reflects light with a given wavelength to prevent the light of that wavelength from arriving at eyes, thereby permitting an intended color vision rectifying spectral characteristic curve to be formed. In this arrangement, reflected light is, for example, green in color, and any coloration of eyeglass lenses are not necessary, thus the appearance of the lenses being fine. Accordingly, the case where an intended color vision rectifying spectral characteristic curve is attained only by use of a partial reflection film is the best from the standpoint of an outer appearance.

However, the coefficient of thermal expansion between the plastic lens and the inorganic films serving as these partial reflection film and anti-reflecting film differ from each other. When the partial reflection film is constituted by build-up of inorganic layers, too thick a film cannot be formed, as much as about 16 layers, at most. If a larger number of layers more than that are built up, there may arise a problem such as peeling during use. Accordingly, where an intended color vision rectifying spectral characteristic curve cannot be formed by use of a 16-layer partial reflection film, it is preferable to use a coloring agent in combination. Since a coloring agent is more inexpensive in comparison with the formation of a partial reflection film, and may, in some case, be positively used in combination from the viewpoint of cost in order to reduce the number of partial reflection film layers.

Moreover, 16 layers are a limit of a layer-built structure of the partial reflection film as stated hereinabove. If it is necessary to form greater than 16 layers, a partial reflection film may be formed on both convex and concave sides of an eyeglass lens so that the total spectral curve made of the combination of the spectral curve of the partial reflection film at the convex side and that of the film at the concave side makes an intended color vision rectifying spectral characteristic curve.

When a partial reflection film or an anti-reflecting film is formed on a hard coat film, it is preferred to subject the hard coat film to surface treatment. Specific examples of the surface treatment include an acid treatment, an alkali treatment, a UV irradiation treatment, a plasma treatment using high frequency discharge in an atmosphere of argon or oxygen, an ion beam irradiation treatment using ions of such as argon, oxygen or nitrogen, and the like.

Preferred arrangements of color vision correcting eyeglass lenses of the invention include lenses wherein a non-colored lens substrate is formed on opposite sides thereof with a non-colored hard coat film and further with a partial reflection film at a convex side and an anti-reflecting film at a concave side, lenses wherein a non-colored lens substrate is formed on opposite sides thereof with a non-colored hard coat film and further with a partial reflection film at a convex side and also at a concave side, lenses wherein a colored lens substrate is formed on opposite sides thereof with a non-colored hard coat film and further with an anti-reflecting film at a convex and/or concave side, lenses wherein a colored lens substrate is formed on opposite sides thereof with a non-colored hard coat film and further with a partial reflection film at a convex side and an anti-reflecting film at a concave side, lenses wherein a non-colored lens substrate is formed on opposite sides thereof with a colored hard coat film and further with an anti-reflecting film at a convex and/or concave side, and lenses where a non-colored lens substrate is formed on opposite sides thereof with a colored hard coat film and further with a partial reflection film at a convex side and an anti-reflecting film at a concave side. Of course, the invention is not limited to those mentioned above.

The invention is more particularly described by way of examples.

EXAMPLE 1

Plastic lenses with A-1 type of color vision rectifying spectral characteristic curve were made using a mirror coat alone.

(1) Preparation of a coating solution

After mixing 941.2 g of methanol, 627.5 g of 1,4-dioxane, and 5904.6 g of a composite fine particle sol of titanium dioxide-iron trioxide-silicon dioxide dispersed in methyl cellosolve (made by Catalysts & Chemicals Industries Co., Ltd., with a solid content of 20 wt %), 1700 g of γ-glycidoxypropyltrimethoxysilane and 219 g of tetramethoxysilane were further mixed. 592 g of a 0.05N hydrochloric acid aqueous solution was dropped in the mixture while agitating, followed by further agitation for 4 hours and aging over day and night. 16.5 g of Fe(III) acetylacetonate and 3 g of a silicone surface active agent (commercially available from Nippon Unicar Co., Ltd., under the commercial name of "L-7001") were added to the solution, followed by further agitation over 4 hours and aging over day and night to obtain a coating solution.

(2) Coating and curing

Thus obtained coating solution was coated onto each eyeglass lens, which had been subjected to alkali treatment and had a refractive index of 1.60 (lens substrate for Seiko Super Lucius, made by Seiko Epson Co.), according to an immersion method. A pull-up rate was at 23 cm/minute. After completion of the coating, the coated lenses were air-dried at 80° C. for 20 minutes, and baked at 110° C. for 180 minutes. The resultant hard coat film had a thickness of about 2 micrometers.

(3) Formation of mirror coat film

The lenses obtained in this way were subjected to plasma treatment (under argon plasma conditions of 400 W×60 seconds) at a convex side thereof. Thereafter, there was formed a mirror coat film, which consisted of 6 layers made of materials and heaving optical film thickness indicated in Table 2 as viewed from the substrate toward the atmosphere, according to a vacuum deposition method (using CES-34 made by Shinku Kikai Kogyo Kabusikigaisha). It should be noted that designed wavelength λ was set at 520 nm.

Super Lucius, made by Seiko Epson Co.), were each immersed in the dye solution for 5 minutes to permit the lens to be colored.

(2) Preparation of coating solution 14.4 kg of butyl cellosolve and 60.3 kg of a composite fine particle sol of titanium dioxide-zirconium dioxide-silicon dioxide dispersed in methanol (made by Catalysts & Chemicals Industries Co., Ltd. and having a solid content of 20 wt %) were mixed, followed by further mixing of 17 kg of γ-glycidoxypropyltrimethoxysilane. 6 kg of a 0.05N hydrochloric acid aqueous solution was dropped in the mixed solution under agitation, followed by further agitation for 4 hours and aging over day and night. Subsequently, 30 g of a silicone surface active agent (made by Nippon Unicar Co., Ltd., under the commercial name of "L-7001"), followed by agitation for 4 hours and aging over day and night to obtain a coating solution.

(3) Coating and curing

Thus obtained coating solution was used for coating by an immersion method. The pull-up rate was set at 18

TABLE 2

|  | Example 1 Mirror Coat Alone | | Example 2 Mirror Coat + Dyeing | | Example 3 Mirror Coat Alone | | Example 4 Mirror Coat + Dyeing | |
| --- | --- | --- | --- | --- | --- | --- | --- | --- |
|  | Material | Optical Film Thickness | Material | Optical Film Thickness | Material | Optical Film Thickness | Material | Optical Film Thickness |
| 1st Layer | $ZrO_2$ | 0.38λ | $ZrO_2$ | 0.26λ | $TiO_2$ | 0.25λ | $ZrO_2$ | 0.32λ |
| 2nd Layer | $SiO_2$ | 0.68λ | $SiO_2$ | 0.75λ | $SiO_2$ | 0.74λ | $SiO_2$ | 0.79λ |
| 3rd Layer | $ZrO_2$ | 0.29λ | $ZrO_2$ | 0.26λ | $TiO_2$ | 0.26λ | $ZrO_2$ | 0.25λ |
| 4th Layer | $SiO_2$ | 0.75λ | $SiO_2$ | 0.26λ | $SiO_2$ | 0.25λ | $SiO_2$ | 0.25λ |
| 5th Layer | $ZrO_2$ | 0.19λ | $ZrO_2$ | 0.20λ | $TiO_2$ | 0.20λ | $ZrO_2$ | 0.25λ |
| 6th Layer | $SiO_2$ | 0.51λ | $SiO_2$ | 0.22λ | $SiO_2$ | 0.22λ | $SiO_2$ | 0.25λ |
| 7th Layer |  |  | $ZrO_2$ | 0.29λ | $TiO_2$ | 0.28λ | $ZrO_2$ | 0.25λ |
| 8th Layer |  |  | $SiO_2$ | 0.50λ | $SiO_2$ | 0.49λ | $SiO_2$ | 0.50λ |
| 9th Layer |  |  |  |  |  |  | $ZrO_2$ | 0.25λ |
| 10th Layer |  |  |  |  |  |  | $SiO_2$ | 0.25λ |
| 11th Layer |  |  |  |  |  |  | $ZrO_2$ | 0.25λ |
| 12th Layer |  |  |  |  |  |  | $SiO_2$ | 0.50λ |
| 13th Layer |  |  |  |  |  |  |  |  |
| 14th Layer |  |  |  |  |  |  |  |  |
| 15th Layer |  |  |  |  |  |  |  |  |
| 16th Layer |  |  |  |  |  |  |  |  |

(4) Formation of an anti-reflecting thin film

The lenses obtained in the above procedure were each subjected to plasma treatment (under argon plasma conditions of 400 W×60 seconds). Thereafter, an anti-reflecting multi-layered film, which was made of five layers of $SiO_2$, $ZrO_2$, $SiO_2$, $ZrO_2$ and $SiO_2$ as viewed from the substrate toward the atmosphere, was formed according to a vacuum deposition method (using CES-34 made by Shinku Kikai Kogyo Kabushikigaisya). The optical film thickness of the respective layers were made such that the initial $SiO_2$ layer, following equivalent film layers of $ZrO_2$ and $SiO_2$, the next $ZrO_2$ layer, and the uppermost $SiO_2$ layer were respectively at λ/4. It will be noted that designed wavelength λ was set at 520 nm.

Figure 5:
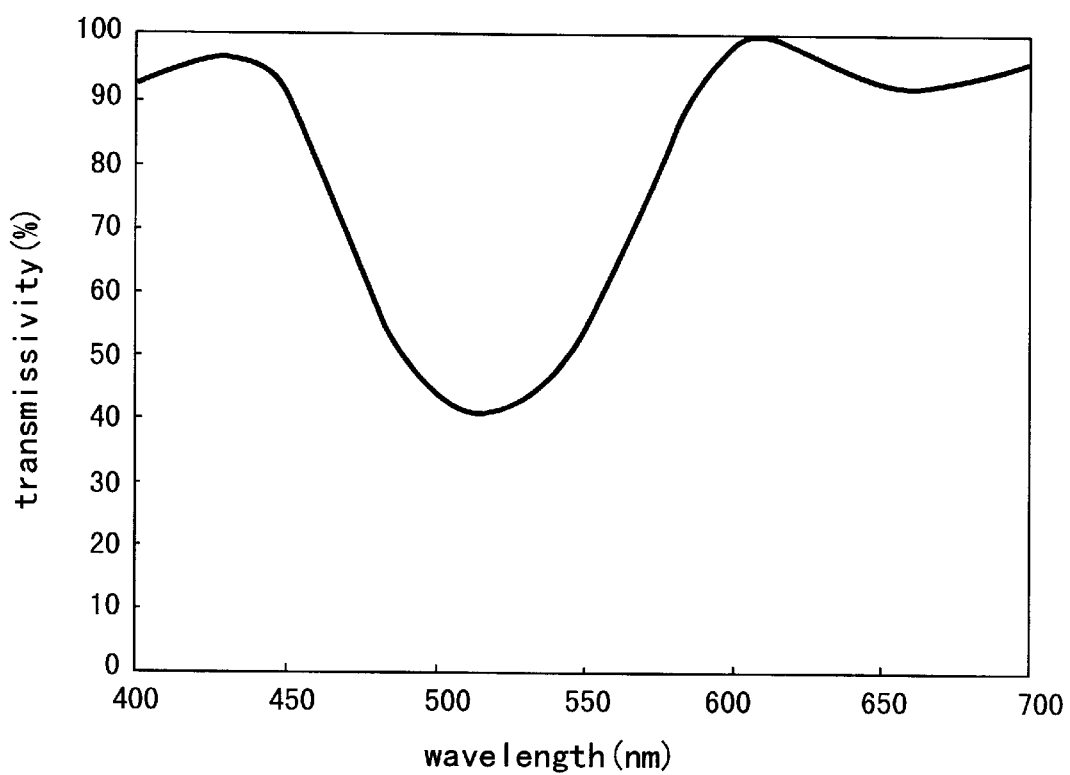
FIG. 5 is a graph showing a spectral transmissivity of an eyeglass lens obtained in Example 1.

The spectral transmissivity of the lens in visible light is shown in FIG. 5.

EXAMPLE 2

Plastic lenses exhibiting A-5 type of color vision rectifying spectral characteristic curve were made by use of a mirror coat and dyeing in combination.

(1) Coloration of lenses 1.5 g of Disperse Red 73 was dispersed in one liter of pure water at 92° C. to provide a dye solution. Eyeglass lenses with a refractive index of 1.60 (lens substrate for Seiko cm/minute. After the coating, the coated substrate was air-dried at 80° C. for 20 minutes, and baked at 130° C. for 120 minutes. The resultant hard coat film had a thickness of about 2 micrometers.

(4) Formation of mirror coat

The resultant lenses were each subjected to ion beam irradiation treatment using an oxygen gas (at an acceleration voltage of 500V×60 seconds) at a convex side thereof, followed by forming a mirror coat, which consisted of 8 layers made of materials and having optical film thickness indicated in Table 2 as viewed from the substrate toward the atmosphere respectively, according to a vacuum deposit-on method (using CES-34, made by Shinku Kikai Kogyo Kabushikigaisya). It should be noted that designed wavelength λ was set at 520 nm.

(5) Formation of anti-reflecting thin film

Individual lenses obtained in the above procedure were subjected to ion beam irradiation treatment using an oxygen gas (under accelerating voltage conditions of 500V×60 seconds) at a concave side thereof. Thereafter, an anti-reflecting multi-layered film, which was made of five layers of $SiO_2$, $ZrO_2$, $SiO_2$, $TiO_2$ and $SiO_2$ arranged in the order of from the substrate toward the atmosphere, was formed according to a vacuum deposition method (using CES-34 made by Shinku Kikai Kogyo Kabushikigaisya). At the time of the formation, the fourth layer of $TiO_2$ was formed by ion beam-assisted vacuum deposition. The optical film thickness of the respective deposited layers were made such that the initial $SiO_2$ layer and following equivalent film layers of $ZrO_2$ and $SiO_2$ were respectively at $\lambda/4$, the next $TiO_2$ was at $\lambda/2$, and the uppermost SiO2 layer was at $\lambda/4$. It should be noted that designed wavelength $\lambda$ was set at 520 nm.

Figure 6:
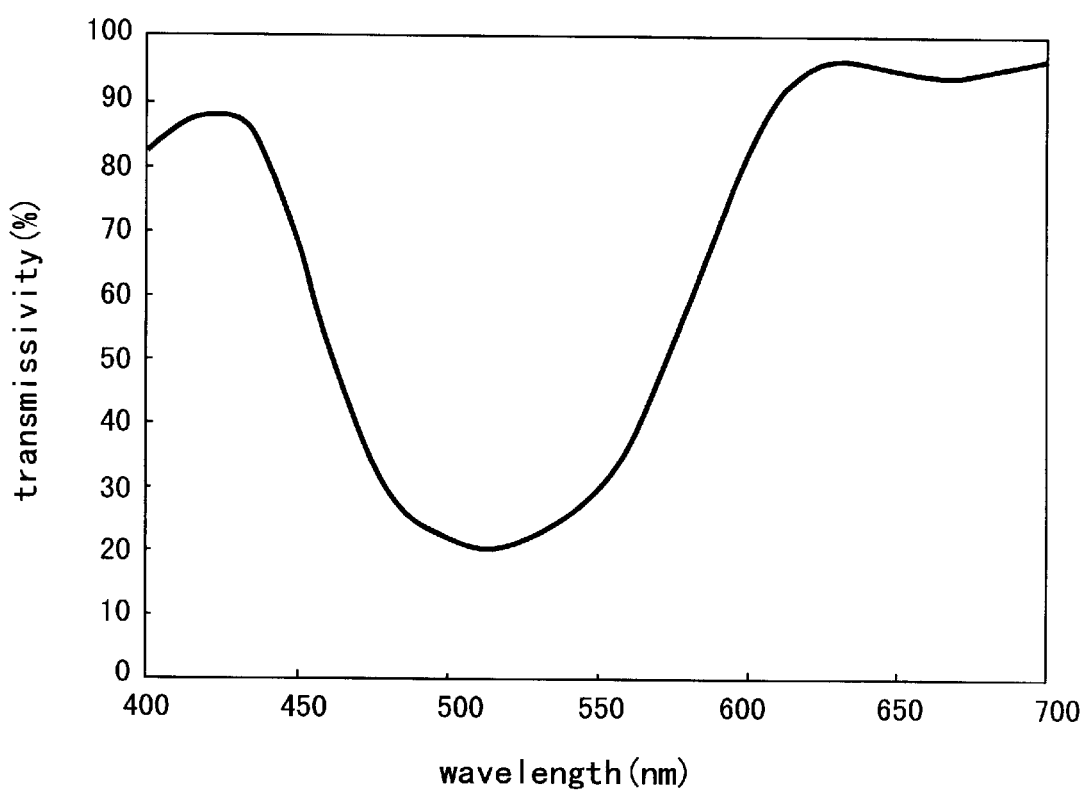
FIG. 6 is a graph showing a spectral transmissivity of an eyeglass lens obtained in Example 2.

The spectral transmissivity of the lens in visible light is shown in FIG. 6.

EXAMPLE 3

Plastic lenses exhibiting A-7 type of color vision rectifying spectral characteristic curve were formed by use of a mirror coat alone.

(1) Preparation of coating solution

In the same manner as iii Example 1, a composition for hard coat was prepared.

(2) Coating and curing

In the same manner as in Example 1, eyeglass lenses were each immersed in the coating solution and baked to form a hard coat film.

(3) Formation of mirror coat

The resultant lenses were each subjected to ion beam irradiation treatment using an oxygen gas (under accelerating voltage conditions of 500V×60 seconds) at a convex side thereof, followed by forming a mirror coat, which consisted of 8 layers made of materials and having optical film thickness indicated in Table 2 as viewed from the substrate toward the atmosphere respectively, according to a vacuum deposition method (using CES-34, made by Shinku Kikai Kogyo Kabushikigaisya). It should be noted that designed wavelength $\lambda$ was set at 520 nm.

(4) Formation of anti-reflecting thin film

The lenses obtained in the above procedure were each subjected to ion beam irradiation treatment using an oxygen gas (under accelerating voltage conditions of 500V×60 seconds) at a concave side thereof. Thereafter, an anti-reflecting multi-layered film, which was made of five layers of $SiO_2$, $ZrO_2$, $SiO_2$, $TiO_2$ and $SiO_2$ arranged in this order from the substrate toward the atmosphere, was formed according to a vacuum deposition method (using CES-34 made by Shinku Kikai Kogyo Kabushikigaisya). At the time of the formation, the fourth layer of $TiO_2$ was formed by ion beam-assisted vacuum deposition. The optical film thickness of the respective layers were made such that the initial $SiO_2$ layer and following equivalent film layers of $ZrO_2$ and $SiO_2$ were respectively at $\lambda/4$, the next $TiO_2$ was at $\lambda/2$, and the uppermost $SiO_2$ layer was at $\lambda/4$. It should be noted that designed wavelength $\lambda$ was set at 520 nm.

Figure 7:
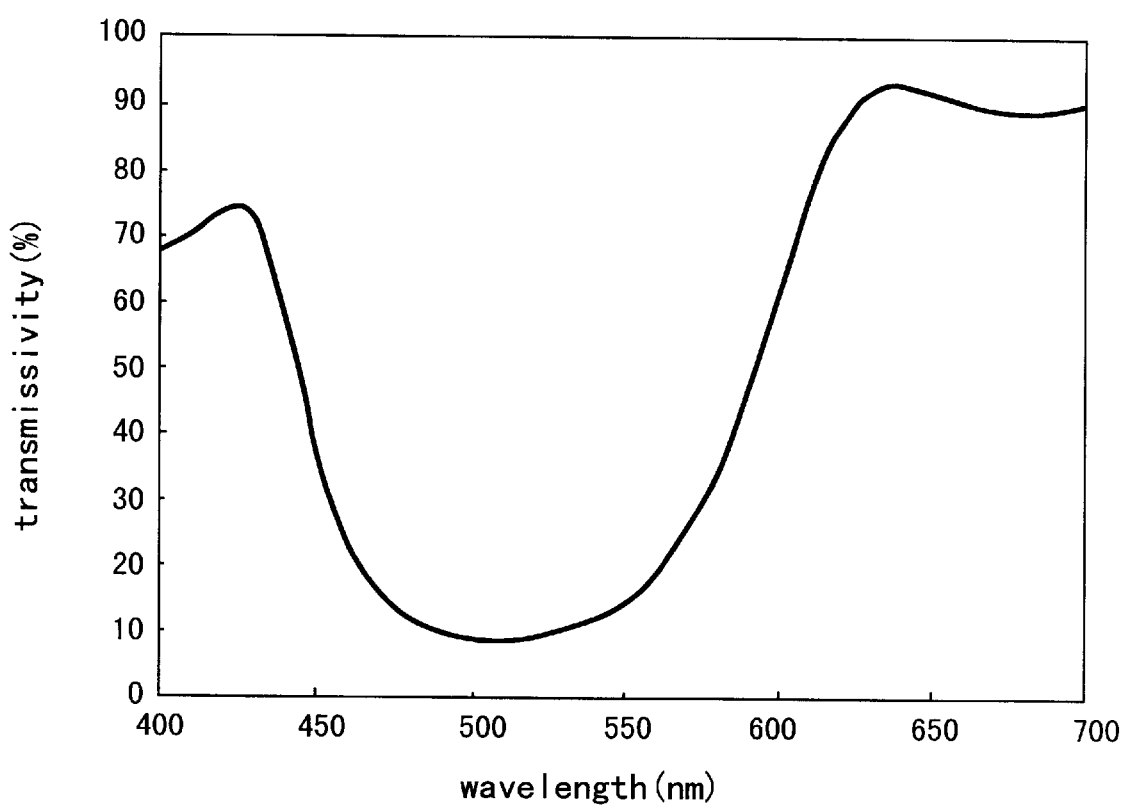
FIG. 7 is a graph showing a spectral transmissivity of an eyeglass lens obtained in Example 3.

The spectral transmissivity of the lens in visible light is shown in FIG. 7.

EXAMPLE 4

Plastic lenses exhibiting A-8 type of color vision rectifying spectral characteristic curve were made by use of a mirror coat and dyeing in combination.

(1) Coloration of lens 1.5 g of Disperse Red 73 was dispersed in one liter of pure water at 92° C. to provide a dye solution. Eyeglass lens with a refractive index of 1.67 (lens substrate for Seiko Super Sovlin, made by Seiko Epson Co.), were each immersed in the dye solution for 5 minutes to permit the lens to be colored.

(2) Preparation of coating solution 307 g of butyl cellosolve and 518 g of a composite fine particle sol of cerium dioxide-titanium dioxide-silicon dioxide dispersed in methyl cellosolve (commercially available from by Catalysts & Chemicals Industries Co., Ltd. under the commercial name of "Optlake 1832" and having a solid content of 20 wt %) were mixed, followed by further mixing of 136 g of γ-glycidoxypropyltrimethoxysilane. 38 g of a 0.05N hydrochloric acid aqueous solution was dropped in the mixed solution under agitation, followed by further agitation for 4 hours and aging over day and night. Subsequently, 2.6 g of Al(III) acetylacetonate, 0.3 g of a silicone surface active agent (commercially available from Nippon Unicar Co., Ltd., under the commercial name of "FZ-2110") and 0.7 g of a phenolic antioxidant (made by Kawaguchi Chem. Ind. Co., Ltd. with a commercial name of "Antage Crystal"), followed by agitation for 4 hours and aging over day and night to obtain a coating solution.

(3) Coating and curing

Thus obtained coating solution was coated onto eyeglass lenses having a refractive index of 1.67 (lens substrate for Seiko Super Sovlin made by Seiko Epson Co.) according to a spin coating method.

Coating conditions were as follows;
10 seconds at 500 r.p.m. (during which the coating solution was coated)
1 second at 2000 r.p.m.
5 seconds at 500 r.p.m.

After coating, the coated substrate was air-dried at 80° C. for 20 minutes and baked at 130° C. for 120 minutes. The resultant hard coat film had a thickness of about 2.3 micrometers.

(4) Formation of mirror coat

The lens obtained in this way was subjected to plasma treatment (under argon plasma conditions of 400 W×60 seconds) at a convex side thereof, followed by forming a mirror coat film, which consisted of 12 layers made of materials and having optical film thickness indicated in Table 3 as viewed from the substrate toward the atmosphere respectively, according to a vacuum deposition method (using BMC-1000, made by Shinku Kikai Kogyo Kabushikigaisya). It should be noted that designed wavelength $\lambda$ was set at 520 nm.

(5) Formation of anti-reflecting thin film

The lens obtained in the above procedure was subjected to plasma treatment (under argon plasma conditions of 400 W×60 seconds) at a concave side thereof. Thereafter, an anti-reflecting multi-layered film, which was made of five Layers of $SiO_2$, $ZrO_2$, $SiO_2$, $ZrO_2$ and $SiO_2$ arranged in this order from the substrate toward the atmosphere, was formed according to a vacuum deposition method (using CES-34 made by Shinku Kikai Kogyo Kabushikigaisya). The optical film thickness of the respective layers were made such that the initial $SiO_2$ layer, following equivalent film layers of $ZrO_2$ and $SiO_2$, the next $ZrO_2$ layer, and the uppermost $SiO_2$ layer were, respectively, at $\lambda/4$. It should be noted that designed wavelength $\lambda$ was set at 520 nm.

Figure 8:
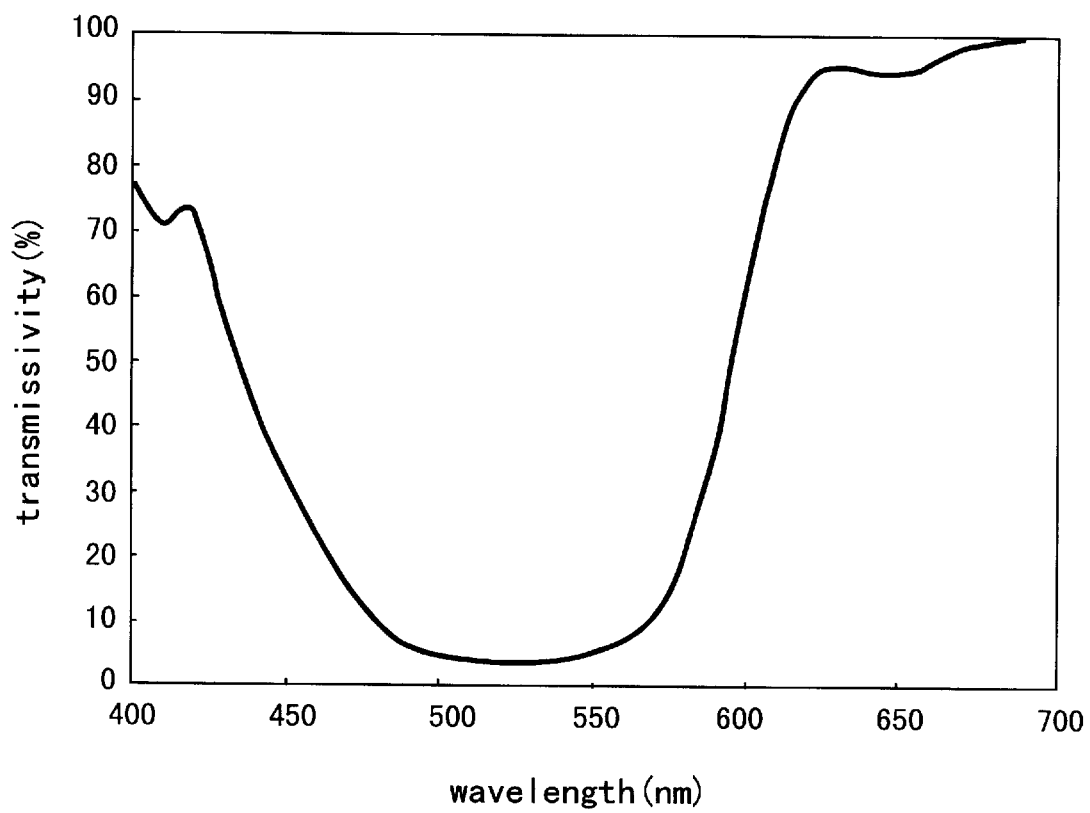
FIG. 8 is a graph showing a spectral transmissivity of an eyeglass lens obtained in Example 4.

The spectral transmissivity of the lens in visible light is shown in FIG. 8.

EXAMPLE 5

A plastic lens exhibiting B-2 type of color vision rectifying spectral characteristic curve was formed by use of a mirror coat and dyeing in combination.

(1) Coloration of lenses 1.5 g of Disperse Red 146, 0.5 g of Disperse Blue 54 and 14 g of Disperse Orange 370 were dispersed in one liter of pure water at 92° C. to provide a dye solution. Eyeglass lenses with a refractive index of 1.56 (lens substrate for Seiko Placks II Super Frontier, made by Seiko Epson Co.), were immersed in the dye solution for 20 minutes to permit the lens to be colored.

(2) Preparation of coating solution 508 g of butyl cellosolve and 290 g of a fine particle sol of antimony pentoxide (made by Nissan Chemical Industries Co., Ltd. with solid content of 30 wt %) dispersed in water were mixed, followed by further mixing of 55 g of γ-glycidoxypropylmethyldimethoxysilane and 55 g of γ-glycidoxypropyltrimethoxysilane. 25 g of a 0.05N hydrochloric acid aqueous solution was dropped in the mixed solution under agitation, followed by further agitation for 4 hours and aging over day and night. Subsequently, 67 g of glycerol diglycidyl ether (made by Nagase Chemicals Ltd. under the commercial name of Denacol EX-313), after which 3.7 g of Fe(III) acetylacetonate, 0.2 g of a silicone surface active agent (made by Big Chemie Co., Ltd., under the commercial name of "BYK-300") and 1.2 g of a phenolic antioxidant (made by Kawaguchi Chem. Ind. Co., Ltd. under the commercial name of "Antage Crystal"), followed by agitation for 4 hours and aging over day and night to obtain a coating solution.

(3) Coating and curing

Thus obtained coating solution was coated by spraying.

The spraying was carried out by use of the Iwata Wider 61 (made by Iwata Coating Machine Co., Ltd. with a nozzle diameter of 1 mm) under conditions of a spray pressure of 3 kg/cm$^2$ and a coating discharge of 100 ml/minute.

After air-drying at 80° C. for 10 minutes after the coating, the coated lenses were each baked at 130° C. for 2 hours. The resultant hard coat film had a thickness of about 4 micrometers.

(4) Formation of mirror coat

The lens obtained in this way was subjected to ion beam irradiation treatment using an oxygen gas (under accelerating voltage conditions of 500V×60 seconds) at a convex side thereof, followed by forming a mirror coat film, which consisted of 8 layers made of materials and having optical film thickness indicated in Table 3 as viewed from the substrate toward the atmosphere, respectively, according to a vacuum deposition method (using CES-34, made by Shinku Kikai Kogyo Kabushikigaisya). It should be noted that designed wavelength λ was set at 520 nm.

tive layers were made such that the initial $SiO_2$ layer and the following equivalent film layers of $ZrO_2$ and $SiO_2$ were respectively at λ/4, the next $TiO_2$ layer was at λ/2, and the uppermost $SiO_2$ layer was at λ/4. It should be noted that designed wavelength λ was set at 520 nm.

Figure 9:
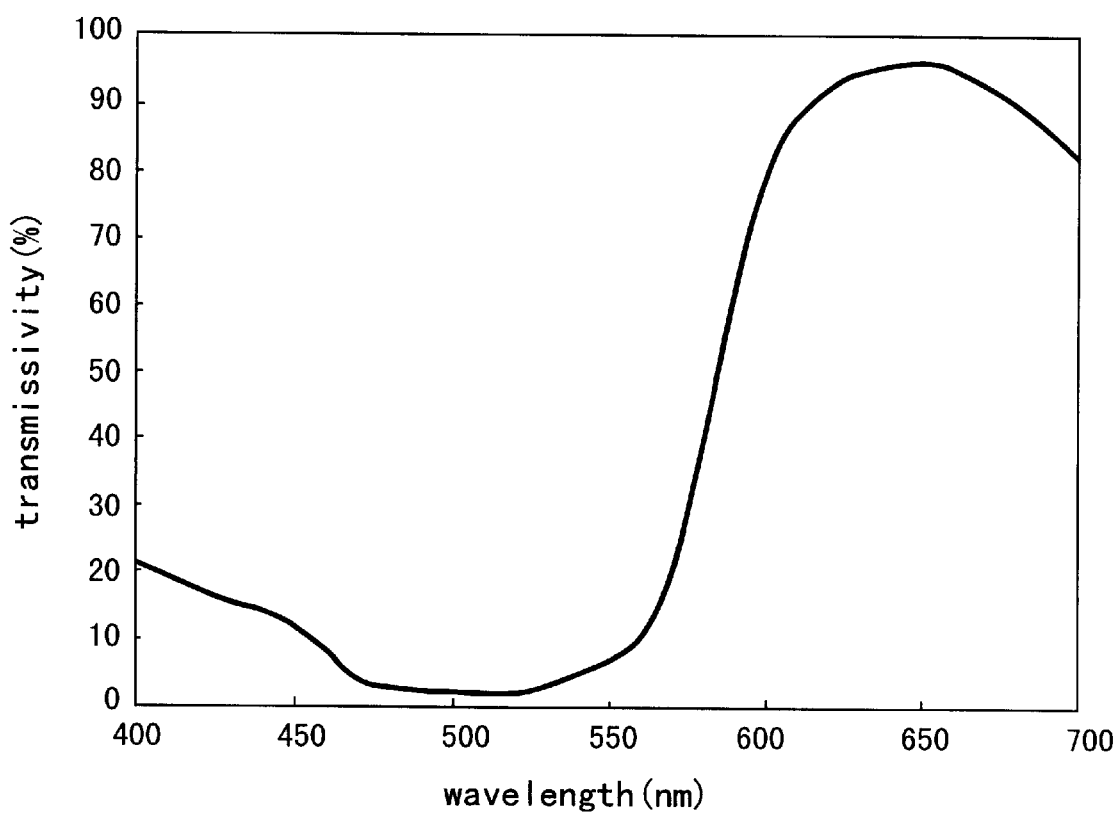
FIG. 9 is a graph showing a spectral transmissivity of an eyeglass lens obtained in Example 5.

The spectral transmissivity of the lens in visible light is shown in FIG. 9.

EXAMPLE 6

Plastic lenses exhibiting B-5 type of color vision rectifying spectral characteristic curve were made by use of a mirror coat and dyeing in combination.

(1) Preparation of coating solution 1832 g of methanol, 785 g of 1,4-dioxane, 5332 g of a composite fine particle sol of titanium dioxide-iron trioxide-silicon dioxide dispersed in methilcellosolve (made by Catalysts & Chemicals Industries Co., Ltd. with a solid content of 20 wt %), 102 g of colloidal silica dispersed in methanol (made by Catalysts & Chemicals Industries Co., Ltd. under the commercial name of Oscal 1132 with a solid content of 30 wt %), and 902 g of γ-glycidoxypropyltrimethoxysilane were mixed together. 250 g of a 0.05N hydrochloric acid aqueous solution was dropped in the mixed solution under agitation, followed by further agitation for 4 hours and aging over day and night. After addition of 762 g of 1,6-hexanediol diglycidyl ether (made by Nagase Chemicals Ltd. under the commercial name of "Denacol EX-212") to the solution, 37 g of $Mg(CO_4)_2$ and 5.5 g of $Li(C_5H_7O_2)$, 3 g of a silicone surface active agent (made by Nippon Unicar Co., Ltd. under the commercial name of "L-7001") and 6 g of a hindered amine photostabilizer (made by Sankyo Co., Ltd. under the commercial name of "Sanol LS-770") were added to the mixture and agitated for 4 hours, followed by aging over day and night to obtain a coating solution.

TABLE 3

|  | Example 5 Mirror Coat + Dyeing | | Example 6 Mirror Coat + Dyeing | | Example 7 Mirror Coat + Dyeing | | Example 8 Mirror Coat Alone | | | |
| --- | --- | --- | --- | --- | --- | --- | --- | --- | --- | --- |
|  | | | | | | | Convex side | | Concave side | |
|  | Material | Optical Film Thickness | Material | Optical Film Thickness | Material | Optical Film Thickness | Material | Optical Film Thickness | Material | Optical Film Thickness |
| 1st Layer | $ZrO_2$ | 0.32λ | $ZrO_2$ | 0.25λ | $ZrO_2$ | 0.37λ | $ZrO_2$ | 0.37λ | $ZrO_2$ | 0.34λ |
| 2nd Layer | $SiO_2$ | 0.61λ | $SiO_2$ | 0.19λ | $SiO_2$ | 0.13λ | $SiO_2$ | 0.13λ | $SiO_2$ | 0.12λ |
| 3rd Layer | $ZrO_2$ | 0.37λ | $ZrO_2$ | 0.25λ | $ZrO_2$ | 0.25λ | $ZrO_2$ | 0.25λ | $ZrO_2$ | 0.23λ |
| 4th Layer | $SiO_2$ | 0.21λ | $SiO_2$ | 0.25λ | $SiO_2$ | 0.25λ | $SiO_2$ | 0.25λ | $SiO_2$ | 0.23λ |
| 5th Layer | $ZrO_2$ | 0.26λ | $ZrO_2$ | 0.25λ | $ZrO_2$ | 0.25λ | $ZrO_2$ | 0.25λ | $ZrO_2$ | 0.23λ |
| 6th Layer | $SiO_2$ | 0.67λ | $SiO_2$ | 0.25λ | $SiO_2$ | 0.25λ | $SiO_2$ | 0.25λ | $SiO_2$ | 0.23λ |
| 7th Layer | $ZrO_2$ | 0.35λ | $ZrO_2$ | 0.25λ | $ZrO_2$ | 0.25λ | $ZrO_2$ | 0.25λ | $ZrO_2$ | 0.23λ |
| 8th Layer | $SiO_2$ | 0.44λ | $SiO_2$ | 0.25λ | $SiO_2$ | 0.25λ | $SiO_2$ | 0.25λ | $SiO_2$ | 0.23λ |
| 9th Layer |  |  | $ZrO_2$ | 0.25λ | $ZrO_2$ | 0.25λ | $ZrO_2$ | 0.25λ | $ZrO_2$ | 0.23λ |
| 10th Layer |  |  | $SiO_2$ | 0.25λ | $SiO_2$ | 0.25λ | $SiO_2$ | 0.25λ | $SiO_2$ | 0.23λ |
| 11th Layer |  |  | $ZrO_2$ | 0.22λ | $ZrO_2$ | 0.25λ | $ZrO_2$ | 0.25λ | $ZrO_2$ | 0.15λ |
| 12th Layer |  |  | $SiO_2$ | 0.49λ | $SiO_2$ | 0.25λ | $SiO_2$ | 0.25λ | $SiO_2$ | 0.55λ |
| 13th Layer |  |  |  |  | $ZrO_2$ | 0.25λ | $ZrO_2$ | 0.25λ |  |  |
| 14th Layer |  |  |  |  | $SiO_2$ | 0.25λ | $SiO_2$ | 0.25λ |  |  |
| 15th Layer |  |  |  |  | $ZrO_2$ | 0.16λ | $ZrO_2$ | 0.16λ |  |  |
| 16th Layer |  |  |  |  | $SiO_2$ | 0.59λ | $SiO_2$ | 0.59λ |  |  |

(5) Formation of anti-reflecting thin film

The lens obtained in thee above procedure was subjected to ion beam irradiation treatment using an oxygen gas (under accelerating voltage conditions of 500V×60 seconds) at a concave side thereof. Thereafter, an anti-reflecting multi-layered film, which was made of five layers of $SiO_2$, $ZrO_2$, $SiO_2$, $TiO_2$ and $SiO_2$ arranged in this order from the substrate toward the atmosphere, was formed according to a vacuum deposition method (using CES-34 made by Shinku Kikai Kogyo Kabushikigaisya). At the time of the formation, the fourth layer of $TiO_2$ was formed by ion beam-assisted vacuum deposition. The optical film thickness of the respec- (2) Coating and curing Thus obtained coating solution was coated onto eyeglass lenses, which had been subjected to alkali treatment and had a refractive index of 1.60 (lens substrate for Seiko Super Lucious made by Seiko Epson Co.), according to an immersion method. The pull-up rate was set at 23 cm/minute. After the coating, the coated lenses were each air-dried at 80° C. for 20 minutes and baked at 130° C. for 60 minutes. The resultant hard coat film had a thickness of about 2 micrometers.

(3) Coloration of lenses 0.5 g of Disperse Red 146, 0.3 g of Disperse Blue 54 and 0.08 g of Disperse Orange 37 were dispersed in one liter of pure water at 92° C. to provide a dye solution. The eyeglass lens obtained above was immersed in the dye solution for 24 minutes to permit the lenses to be colored.

(4) Formation of mirror coat

The lens obtained in this way was subjected to plasma treatment (under argon plasma conditions of 400 W×60 seconds) at a convex side thereof, followed by forming a mirror coat film, which consisted of 12 layers made of materials and having optical film thickness indicated in Table 3 as viewed from the substrate toward the atmosphere respectively, according to a vacuum deposition method (using BMC-1000, made by Shinku Kikai Kogyo Kabushikigaisya). It should be noted that designed wavelength $\lambda$ was set at 520 nm.

(5) Formation of anti-reflecting thin film

The lens obtained in the above procedure was subjected to plasma treatment (under argon plasma conditions of 400 W×60 seconds) at a concave side thereof. Thereafter, an anti-reflecting multi-layered film, which was made of 5 layers of $SiO_2$, $ZrO_2$, $SiO_2$, $ZrO_2$ and $SiO_2$ arranged in the order of from the substrate toward the atmosphere, was formed according to a vacuum deposition method (using CES-34 made by Shinku Kikai Kogyo Kabushikigaisya). The optical film thickness of the respective layers were made such that the initial $SiO_2$ layer, the following equivalent film layers of $ZrO_2$ and $SiO_2$, the next $ZrO_2$ layer, and the uppermost $SiO_2$ layer were respectively at $\lambda/4$. It will be noted that designed wavelength $\lambda$ was set at 520 nm.

Figure 10:
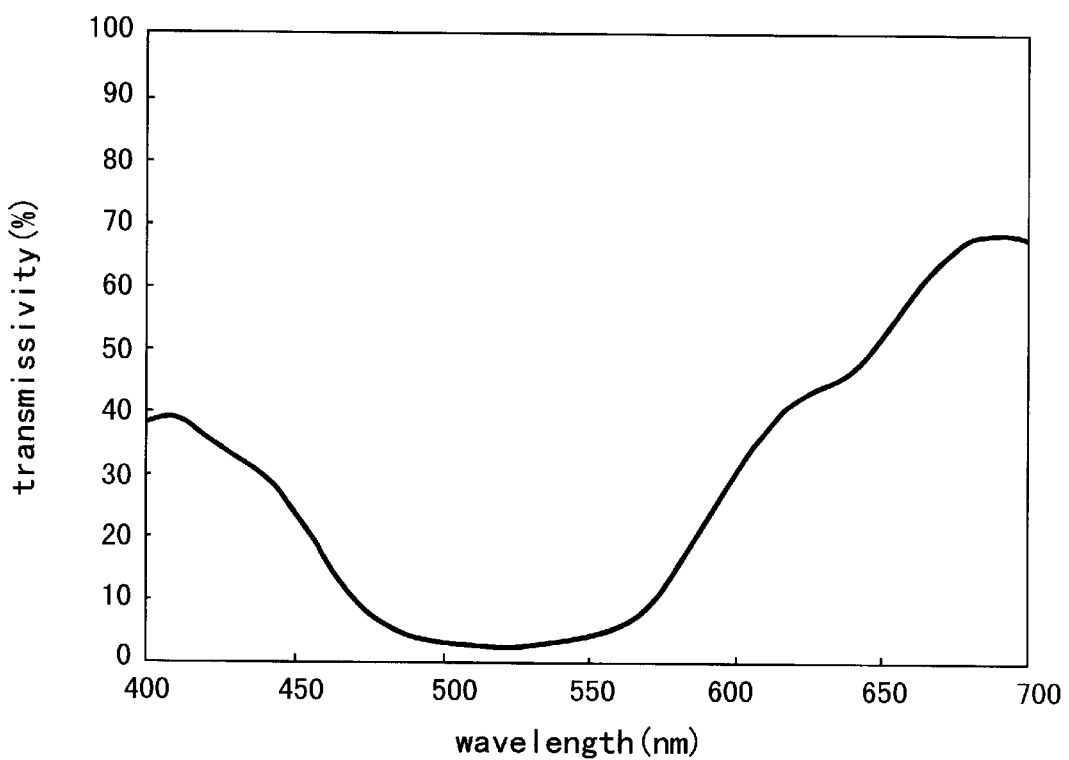
FIG. 10 is a graph showing a spectral transmissivity of an eyeglass lens obtained in Example 6.

The spectral transmissivity of the lens in visible light is shown in FIG. 10.

EXAMPLE 7

Plastic lenses exhibiting B-8 type of color vision rectifying spectral characteristic curve were made by use of a mirror coat and dyeing in combination.

(1) Coloration of lenses 0.3 g of Disperse Red 146, 1.2 g of Disperse Blue 54, 0.5 g of Disperse Orange 37 and 0.20 g of Disperse Yellow 54 were dispersed in one liter of pure water at 92° C. to provide a dye solution. Eyeglass lenses having a refractive index of 1.60 (lens substrate for Seiko Super Lucious made by Seiko Epson Co.) were immersed in the dye solution for 60 minutes to permit the lenses to be colored.

(2) Preparation of coating solution

In the same manner as in Example 2, a composition for hard coat was prepared.

(3) Coating and curing

In the same manner as in Example 2, the eyeglass lenses were immersed in the coating solution and baked to form a hard coat film.

(4) Formation of mirror coat

The lens obtained in this way was subjected to plasma treatment (under argon plasma conditions of 400 W×60 seconds) at a convex side thereof, followed by forming a mirror coat film, which consisted of 12 layers made of materials and having optical film thickness indicated in Table 3 as viewed from the substrate toward the atmosphere respectively, according to a vacuum deposition method (using BMC-1000, made by Shinku Kikai Kogyo Kabushikigaisya). It will be noted that designed wavelength $\lambda$ was set at 520 nm.

(5) Formation of anti-reflecting thin film

The lens obtained in the above procedure was subjected to plasma treatment (under argon plasma conditions of 400 W×60 seconds) at a concave side thereof. Thereafter, an anti-reflecting multi-layered film, which was made of five layers of $SiO_2$, $ZrO_2$, $SiO_2$, $ZrO_2$ and $SiO_2$ arranged in this order from the substrate toward the atmosphere, was formed according to a vacuum deposition method (using CES-34 made by Shinku Kikai Kogyo Kabushikigaisya). The optical film thickness of the respective layers were made such that the initial $SiO_2$ layer, the following equivalent film layers of $ZrO_2$ and $SiO_2$, the next $ZrO_2$ layer, and the uppermost $SiO_2$ layer were, respectively, at $\lambda/4$. It should be noted that designed wavelength $\lambda$ was set at 520 nm.

Figure 11:
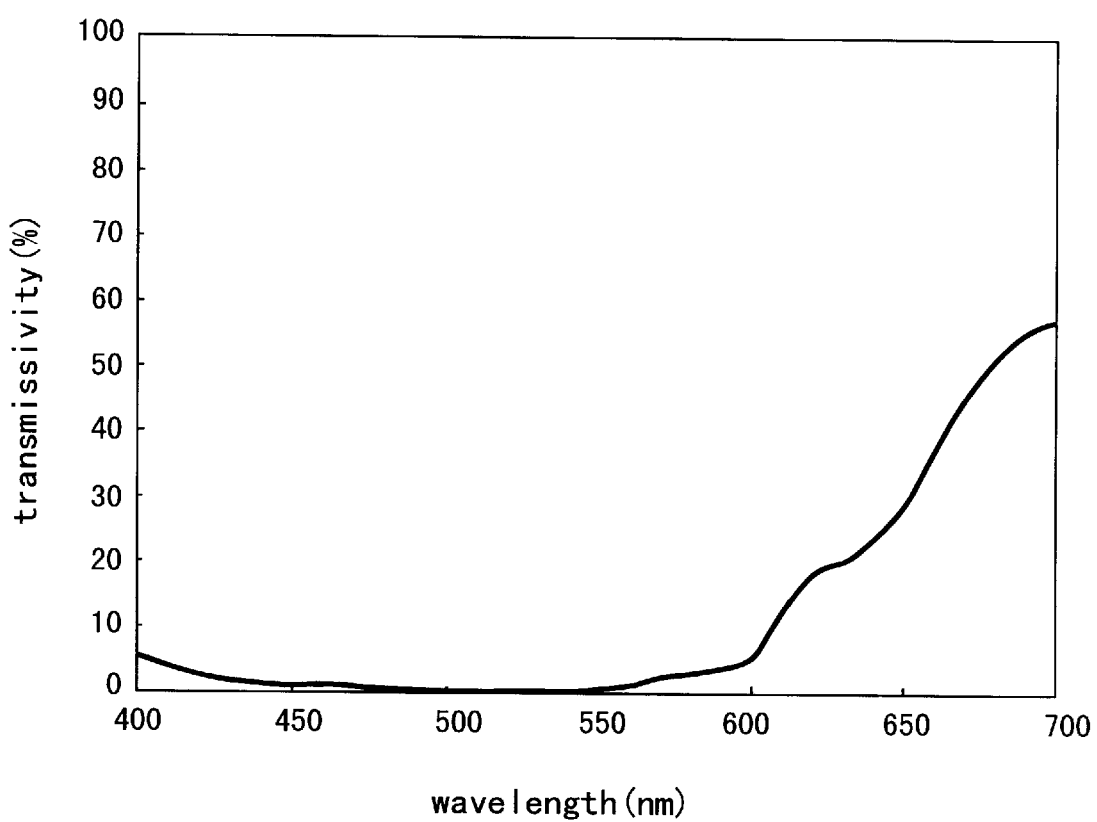
FIG. 11 is a graph showing a spectral transmissivity of an eyeglass lens obtained in Example 7.

The spectral transmissivity of the lens in visible light is shown in FIG. 11.

EXAMPLE 8

Plastic lenses exhibiting B-3 type of color vision rectifying spectral characteristic curve were made while forming a mirror coat on both convex and concave sides of the lens.

(1) Preparation of coating solution

In the same manner as in Example 2, a composition for hard coat was prepared.

(2) Coating and curing

In the same manner as in Example 2, the eyeglass lenses were immersed in the coating solution and baked to form a hard coat film.

(3) Formation of mirror coat

The lens obtained in this way was subjected to ion beam irradiation treatment (under accelerating voltage conditions of 500V×60 seconds) using an oxygen gas at a convex side thereof, followed by forming a mirror coat film, which consisted of 16 layers made of materials and having optical film thickness indicated in Table 3 as viewed from the substrate toward the atmosphere respectively, according to a vacuum deposition method (using CES-34, made by Shinku Kikai Kogyo Kabushikigaisya). It should be noted that designed wavelength $\lambda$ was set at 520 nm.

Moreover, the concave side was subjected to ion beam irradiation treatment (under accelerating voltage conditions of 500V×60 seconds) at a convex side thereof, followed by forming a mirror coat, which consisted of 12 layers made of materials and heaving optical film thickness indicated in Table 3 as viewed from the substrate toward the atmosphere respectively, according to a vacuum deposition method (using CES-34, made by Shinku Kikai Kogyo Kabushikigaisya). It should be noted that designed wavelength $\lambda$ was set at 520 nm.

Figure 12:
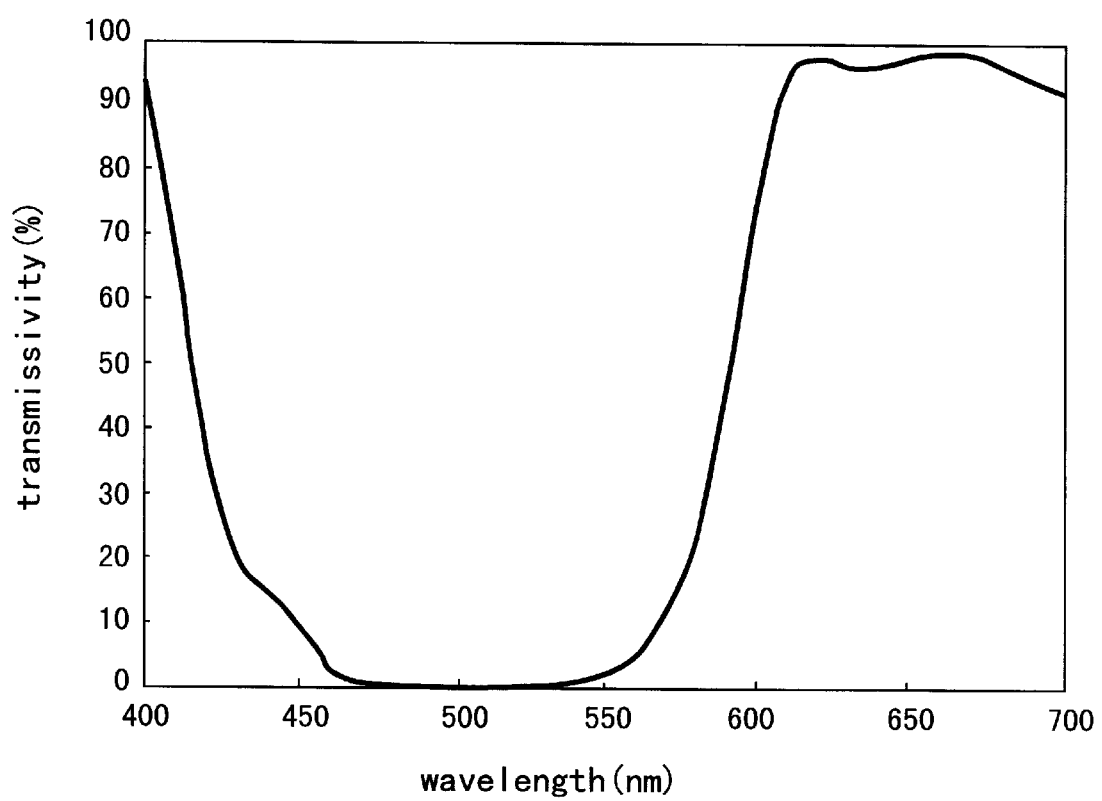
FIG. 12 is a graph showing a spectral transmissivity of an eyeglass lens obtained in Example 8.

The spectral transmissivity of the lens in visible light is shown in FIG. 12.

EXAMPLE 9

Plastic lenses exhibiting C-8 type of color vision rectifying spectral characteristic curve were made by dyeing alone.

(1) Coloration of lenses 0.08 g of Disperse Red 146, 1.15 g of Disperse Blue 54, 0.19 g of Disperse Orange 37 and 0.02 g of Disperse Yellow 54 were dispersed in one liter of pure water at 92° C. to provide a dye solution. Eyeglass lenses having a refractive index of 1.60 (lens substrate for Seiko Super Lucious made by Seiko Epson Co.) were immersed in the dye solution for 13 minutes to permit the lenses to be colored.

(2) Preparation of coating solution

In the same manner as in Example 2, a composition for hard coat was prepared.

(3) Coating and curing

In the same manner as in Example 2, the eyeglass lenses were immersed in the coating solution and baked to form a hard coat film.

(4) Formation of anti-reflecting thin film

The lens obtained in this way was subjected to plasma treatment (under argon plasma conditions of 400 W×60 seconds) at opposite sides thereof, followed by forming an anti-reflecting multi-layered film, which was made of five layers of $SiO_2$, $ZrO_2$, $SiO_2$, $ZrO_2$ and $SiO_2$ arranged in this order from the substrate toward the atmosphere, was formed according to a vacuum deposition method (using CES-34 made by Shinku Kikai Kogyo Kabushikigaisya). The optical film thickness of the respective layers were made such that the initial $SiO_2$ layer, the following equivalent film layers of $ZrO_2$ and $SiO_2$, the next $ZrO_2$ layer, and the uppermost $SiO_2$ layer were respectively at $\lambda/4$. It should be noted that designed wavelength $\lambda$ was set at 520 nm.

Figure 13:
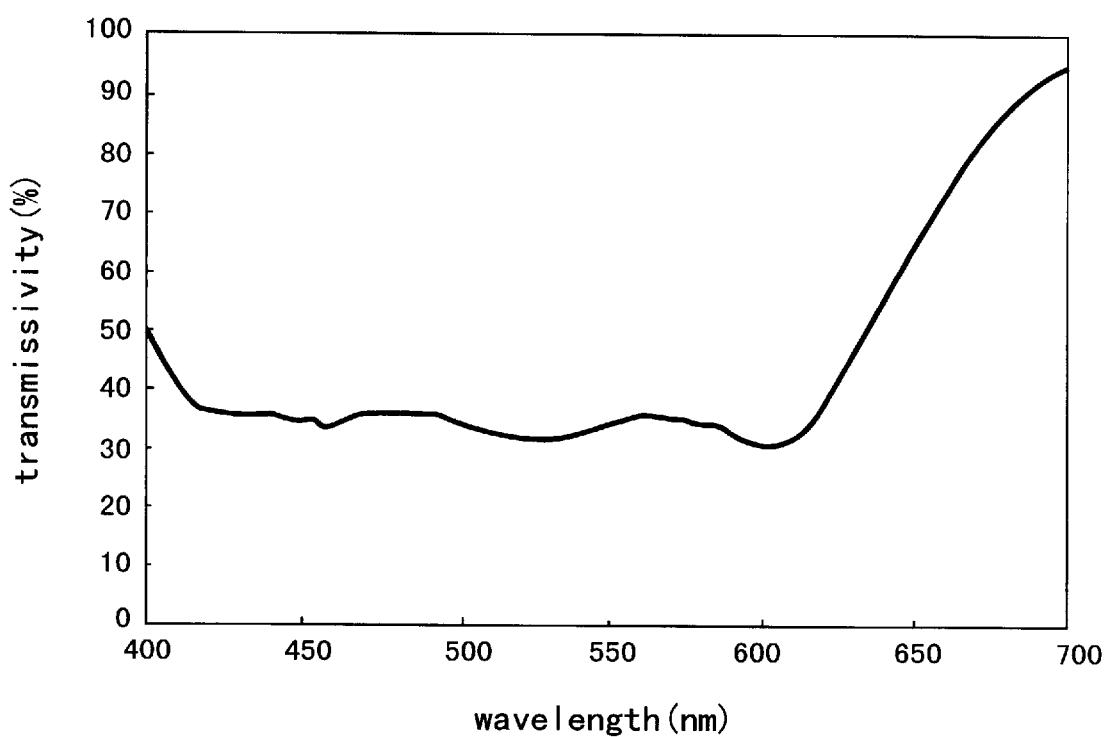
FIG. 13 is a graph showing a spectral transmissivity of an eyeglass lens obtained in Example 9.

The spectral transmissivity of the lens in visible light is shown in FIG. 13.

EXAMPLE 10

Plastic lenses exhibiting D-8 type of color vision rectifying spectral characteristic curve were made by dyeing alone.

(1) Coloration of lenses 0.02 g of Disperse Red 146, 0.04 g of Disperse Blue 54, 1.00 g of Disperse Orange 37 and 0.70 g of Disperse Yellow 54 were dispersed in one liter of pure water at 92° C. to provide a dye solution. Eyeglass lenses having a refractive index of 1.60 (lens substrate for Seiko Super Lucious made by Seiko Epson Co.) were immersed in the dye solution for 8 minutes to permit the lenses to be colored.

(2) Preparation of coating solution

In the same manner as in Example 2, a composition for hard coat was prepared.

(3) Coating and curing

In the same manner as in Example 2, the eyeglass lenses were immersed in the coating solution and baked to form a hard coat film.

(4) Formation of anti-reflecting thin film

The lens obtained in this way was subjected to ion beam irradiation treatment (under accelerating voltage conditions of 500V×60 seconds) at opposite sides thereof, followed by forming an anti-reflecting multi-layered film, which was made of five layers of $SiO_2$, $ZrO_2$, $SiO_2$, $TiO_2$ and $SiO_2$ arranged in this order from the substrate toward the atmosphere, was formed according to a vacuum deposition method (using CES-34 made by Shinku Kikai Kogyo Kabushikigaisya). At the time of formation, the fourth $TiO_2$ layer was formed according to the ion-beam assisted vacuum deposition technique. The optical film thickness of the respective layers were made such that the initial $SiO_2$ layer and the following equivalent film layers of $ZrO_2$ and $SiO_2$ were, respectively at $\lambda/4$, the next $TiO_2$ layer was at $\lambda/2$, and the uppermost $SiO_2$ layer was at $\lambda/4$. It should be noted that designed wavelength $\lambda$ was set at 520 nm.

Figure 14:
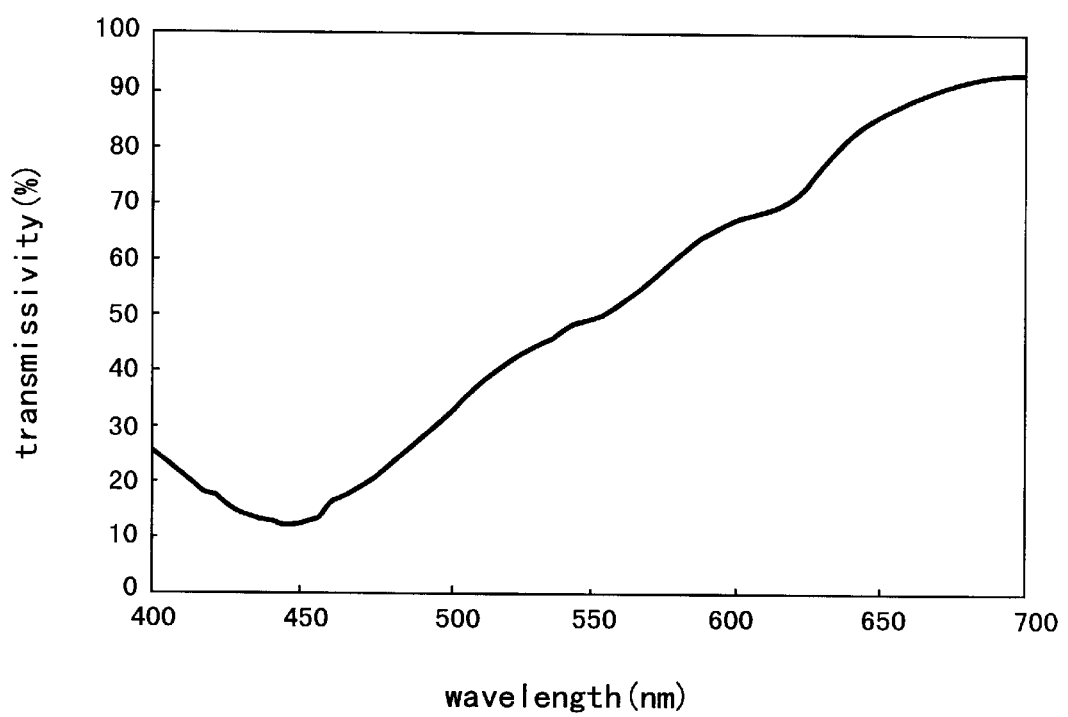
FIG. 14 is a graph showing a spectral transmissivity of an eyeglass lens obtained in Example 10.

The spectral transmissivity of the lens in visible light is shown in FIG. 14.

EXAMPLE 11

Plastic lenses exhibiting B-7 type of color vision rectifying spectral characteristic curve were made by dyeing alone.

(1) Coloration of lenses 0.7 g of Disperse Red 146, 0.70 g of Disperse Blue 54, 0.04 g of Disperse Orange 37 and 0.70 g of Disperse Violet 65 were dispersed in one liter of pure water at 92° C. to provide a dye solution. Eyeglass lenses having a refractive index of 1.60 (lens substrate for Seiko Super Lucious made by Seiko Epson Co.) were immersed in the dye solution for 55 minutes to permit the lenses to be colored.

(2) Preparation of coating solution

In the same manner as in Example 2, a composition for hard coat was prepared.

(3) Coating and curing

In the same manner as in Example 2, the eyeglass lenses were immersed in the coating solution and baked to form a hard coat film.

(4) Formation of anti-reflecting thin film

The lens obtained in this way was subjected to ion beam irradiation treatment using an oxygen gas (under accelerating voltage conditions of 500V×60 seconds) at opposite sides thereof, followed by forming an anti-reflecting multi-layered film, which was made of 5 layers of $SiO_2$, $ZrO_2$, $SiO_2$, $TiO_2$ and $SiO_2$ arranged in this order from the substrate toward the atmosphere, was formed according to a vacuum deposition method (using CES-34 made by Shinku Kikai Kogyo Kabushikigaisya). At the time of the formation, the fourth $TiO_2$ layer was formed according to the ion beam-assisted vacuum deposition technique. The optical film thickness of the respective layers were made such that the initial $SiO_2$ layer and the following equivalent film layers of $ZrO_2$ and $SiO_2$ were respectively at $\lambda/4$, the next $TiO_2$ layer was at $\lambda/2$, and the uppermost $SiO_2$ layer was at $\lambda/4$. It should be noted that designed wavelength $\lambda$ was set at 520 nm.

Figure 15:
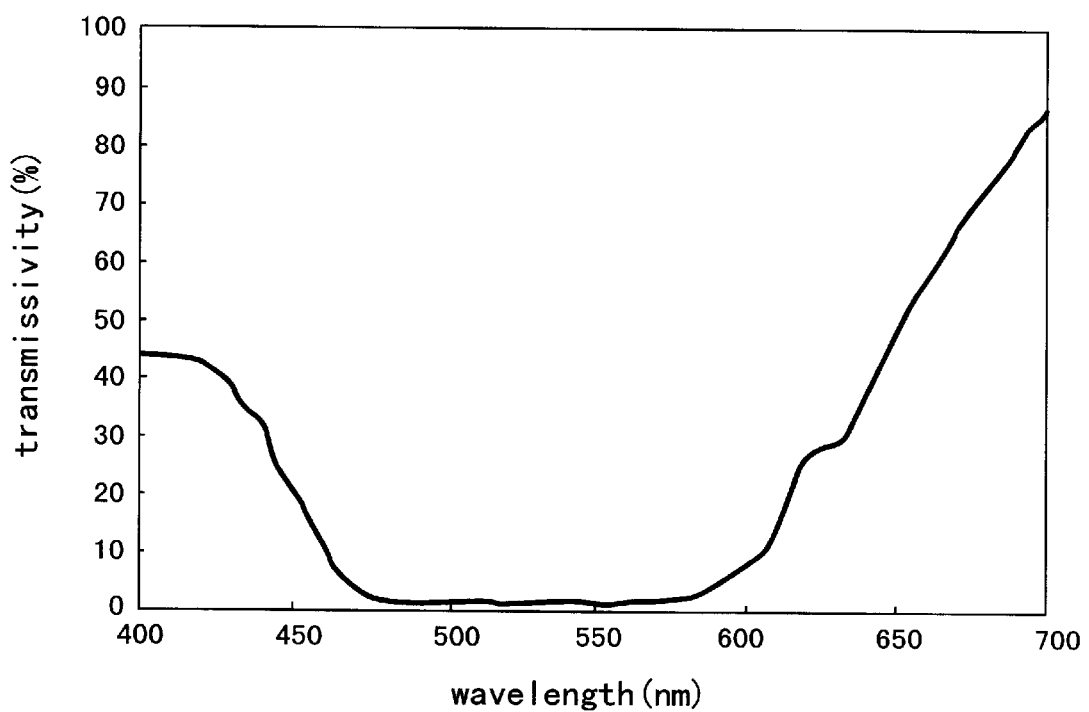
FIG. 15 is a graph showing a spectral transmissivity of an eyeglass lens obtained in Example 11.

The spectral transmissivity of the lens in visible light is shown in FIG. 15.

As having described hereinabove, the color vision correcting eyeglass lenses of the present invention are, respectively, provided with intended color vision rectifying spectral characteristic curves capable of imparting the ability of discriminating a normal color vision to color vision defectives having color blindness or color weakness, and are inexpensive with high performance.

What is claimed is:

1. An eyeglass lens for correcting color vision comprising:

a color vision correcting spectral characteristic curve operative to externally convert a proportion of stimulation value of three kinds of optic cone cells in a retina of an abnormal color viewer, wherein said eyeglass lens comprises a non-colored plastic lens substrate, a non-colored hard coat film formed on both sides of said lens substrate, a partial reflection film having up to 16 layers formed on said non-colored hard coat film at a convex side of said lens substrate, and an anti-reflecting film formed on said non-colored hard coat film at a concave side of said lens substrate;

said hard coat film is formed on said lens substrate by a coating composition comprising:

metal oxide fine particles selected from a group consisting of Si, Sn, Sb, Ce, Zr and Ti, and/or composite fine particles made of two or more inorganic oxides selected from a group consisting of Si, Al, Sn, Sb, Ta, Ce, La, Fe, W, Zr, In and Ti, and organosilicon compounds having a polymerizable group in one molecule; and said color vision correcting characteristic curve is established by said partial reflection film.

2. An eyeglass lens for correcting color vision comprising:

a color vision correcting spectral characteristic curve operative to externally convert a proportion of stimulation value of three kinds of optic cone cells in a retina of an abnormal color viewer, wherein said eyeglass lens comprises a non-colored plastic lens substrate, a non-colored hard coat film formed on both sides of said lens substrate, and a partial reflection film having up to 16 layers formed on said non-colored hard coat film at both of a convex side and a concave side of said lens substrate; and said color vision correcting characteristic curve is established by said partial reflecting film.

3. An eyeglass lens for correcting color vision according to claim 2, wherein said hard coat film is formed on said lens substrate by a coating composition comprising:

metal oxide fine particles selected from a group consisting of Si, Sn, Sb, Ce, Zr and Ti, and/or composite fine particles made of two or more inorganic oxides selected from a group consisting of Si, Al, Sn, Sb, Ta, Ce, La, Fe, W, Zr, In and Ti, and organosilicon compounds having a polymerizable group in one molecule.

4. An eyeglass lens for correcting color vision comprising:

a color vision correcting spectral characteristic curve operative to externally convert a proportion of stimulation value of three kinds of optic cone cells in a retina of an abnormal color viewer, wherein said eyeglass lens comprises a colored plastic lens substrate, a non-colored hard coat film formed on both sides of said lens substrate, and an anti-reflecting film formed on said non-colored hard coat film at a convex side and/or a concave side of said lens substrate;

said hard coat film is formed on said lens substrate by a coating composition comprising:

metal oxide fine particles selected from a group consisting of Si, Sn, Sb, Ce, Zr and Ti, and/or composite fine particles made of two or more inorganic oxides selected from a group consisting of Si, Al, Sn, Sb, Ta, Ce, La, Fe, W, Zr, In and Ti, and organosilicon compounds having a polymerizable group in one molecule; and said color vision correcting characteristic curve is established by a coloring agent in said lens substrate.

5. An eyeglass lens for correcting color vision comprising:

a color vision correcting spectral characteristic curve operative to externally convert a proportion of stimulation value of three kinds of optic cone cells in a retina of an abnormal color viewer, wherein said eyeglass lens comprises a colored plastic lens substrate, a non-colored hard coat film formed on both sides of said lens substrate, a partial reflection film having up to 16 layers formed on said non-colored hard coat film at a convex side of said lens substrate, and an anti-reflecting film formed on said non-colored hard coat film at a concave side of said lens substrate;

said hard coat film is formed on said lens substrate by a coating composition comprising:

metal oxide fine particles selected from a group consisting of Si, Sn, Sb, Ce, Zr and Ti, and/or composite fine particles made of two or more inorganic oxides selected from a group consisting of Si, Al, Sn, Sb, Ta, Ce, La, Fe, W, Zr, In and Ti, and organosilicon compounds having a polymerizable group in one molecule; and said color vision correcting characteristic curve is established by a coloring agent in said lens and said partial reflection film.

6. An eyeglass lens for correcting color vision comprising:

a color vision correcting spectral characteristic curve operative to externally convert a proportion of stimulation value of three kinds of optic cone cells in a retina of an abnormal color viewer, wherein said eyeglass lens comprises a colored plastic lens substrate, a non-colored hard coat film formed on both sides of said lens substrate, and a partial reflection film having up to 16 layers formed on said non-colored hard coat film at both of a convex side and a concave side of said lens substrate; and said color vision correcting characteristic curve is established by a coloring agent in said lens and said partial reflection film.

7. An eyeglass lens for correcting color vision according to claim 6, wherein said hard coat film is formed on said lens substrate by a coating composition comprising:

metal oxide fine particles selected from a group consisting of Si, Sn, Sb, Ce, Zr and Ti, and/or composite fine particles made of two or more inorganic oxides selected from a group consisting of Si, Al, Sn, Sb, Ta, Ce, La, Fe, W, Zr, In and Ti, and organosilicon compounds having a polymerizable group in one molecule.

8. An eyeglass lens for correcting color vision comprising:

a color vision correcting spectral characteristic curve operative to externally convert a proportion of stimulation value of three kinds of optic cone cells in a retina of an abnormal color viewer, wherein said eyeglass lens comprises a non-colored plastic lens substrate, a colored hard coat film formed on both sides of said lens substrate, and an anti-reflection film formed on said colored hard coat film at a convex and/or a concave side of said lens substrate;

said hard coat film is formed on said lens substrate by a coating composition comprising:

metal oxide fine particles selected from a group consisting of Si, Sn, Sb, Ce, Zr and Ti, and/or composite fine particles made of two or more inorganic oxides selected from a group consisting of Si, Al, Sn, Sb, Ta, Ce, La, Fe, W, Zr, In and Ti, and organosilicon compounds having a polymerizable group in one molecule; and said color vision correcting characteristic curve is established by a coloring agent in said hard coat film.

9. An eyeglass lens for correcting color vision according to claim 8, wherein said hard coat film is formed on said lens substrate by a coating composition further comprising:

disilane compounds of a general formula (1) and/or polyfunctional epoxy compounds:

$$X^2_{3-k}-\underset{R^3_k}{Si}-Y-\underset{R^4_m}{Si}-X^3_{3-m} \quad (1)$$

wherein $R^3$ and $R^4$ independently represent a hydrocarbon group having 1 to 6 carbon atoms, $X^2$ and $X^3$ independently represent a hydrolyzable group, Y represents an organic group having a carbonate group or an epoxy group, and k and m are each 0 or 1.

10. An eyeglass lens for correcting color vision comprising:

a color vision correcting spectral characteristic curve operative to externally convert a proportion of stimulation value of three kinds of optic cone cells in a retina of an abnormal color viewer, wherein said eyeglass lens comprises a non-colored plastic lens substrate, a colored hard coat film formed on both sides of said lens substrate, a partial reflection film having 16 layers or below formed on said colored hard coat film at a convex side of said lens substrate, and an antireflecting film formed on said hard coat film at a concave side of said lens substrate;

said hard coat film is formed on said lens substrate by a coating composition comprising:

metal oxide fine particles selected from a group consisting of Si, Sn, Sb, Ce, Zr and Ti, and/or composite fine particles made of two or more inorganic oxides selected from a group consisting of Si, Al, Sn, Sb, Ta, Ce, La, Fe, W, Zr, In and Ti, and organosilicon compounds having a polymerizable group in one molecule; and said color vision correcting characteristic curve is established by a coloring agent in said hard coat film and said partial reflection film.

11. An eyeglass lens for correcting color vision according to claim 10, wherein said hard coat film is formed on said lens substrate by a coating composition further comprising:

disilane compounds of a general formula (1) and/or polyfunctional epoxy compounds:

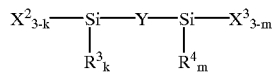

(1)

wherein $R^3$ and $R^4$ independently represent a hydrocarbon group having 1 to 6 carbon atoms, $X^2$ and $X^3$ independently represent a hydrolyzable group, Y represents an organic group having a carbonate group or an epoxy group, and k and m are each 0 or 1.

12. An eyeglass lens for correcting color vision comprising:

a color vision correcting spectral characteristic curve operative to externally convert a proportion of stimulation value of three kinds of optic cone cells in a retina of an abnormal color viewer, wherein said eyeglass lens comprises a non-colored plastic lens substrate, a colored hard coat film formed on both sides of said substrate, and a partial reflection film having up to 16 layers formed on said colored hard coat film at both of a convex side and a concave side of said lens substrate; and said color vision correcting characteristic curve is established by a coloring agent in said hard coat film and said partial reflecting film.

13. An eyeglass lens for correcting color vision according to claim 12, wherein said hard coat film is formed on said lens substrate by a coating composition comprising:

metal oxide fine particles selected from a group consisting of Si, Sn, Sb, Ce, Zr and Ti, and/or composite fine particles made of two or more inorganic oxides selected from a group consisting of Si, Al, Sn, Sb, Ta, Ce, La, Fe, W, Zr, In and Ti, and organosilicon compounds having a polymerizable group in one molecule.

14. An eyeglass lens for correcting color vision according to claim 13, wherein said hard coat film is formed on said lens substrate by a coating composition further comprising:

disilane compounds of a general formula (1) and/or polyfunctional epoxy compounds:

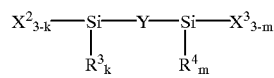

(1)

wherein $R^3$ and $R^4$ independently represent a hydrocarbon group having 1 to 6 carbon atoms, $X^2$ and $X^3$ independently represent a hydrolyzable group, Y represents an organic group having a carbonate group or an epoxy group, and k and m are each 0 or 1.

* * * * *